(12) United States Patent
Suzuki et al.

(10) Patent No.: US 9,868,145 B2
(45) Date of Patent: Jan. 16, 2018

(54) FORMING SIMULATION METHOD, FORMING SIMULATOR, PROGRAM AND RECORDING MEDIUM THEREFOR, AND SIMULATION-BASED FORMING METHOD

(75) Inventors: Noriyuki Suzuki, Tokyo (JP); Takashi Ariga, Tokyo (JP); Akihiro Uenishi, Tokyo (JP); Shigeru Yonemura, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 785 days.

(21) Appl. No.: 13/119,656

(22) PCT Filed: Jul. 29, 2009

(86) PCT No.: PCT/JP2009/063532
§ 371 (c)(1),
(2), (4) Date: Mar. 17, 2011

(87) PCT Pub. No.: WO2010/038539
PCT Pub. Date: Apr. 8, 2010

(65) Prior Publication Data
US 2011/0172803 A1    Jul. 14, 2011

(30) Foreign Application Priority Data

Sep. 30, 2008  (JP) ................................. 2008-252730
Sep. 30, 2008  (JP) ................................. 2008-253278

(51) Int. Cl.
G06F 17/50    (2006.01)
B21D 22/00    (2006.01)

(52) U.S. Cl.
CPC ......... *B21D 22/00* (2013.01); *G06F 17/5018* (2013.01); *G06F 2217/41* (2013.01); *G06F 2217/42* (2013.01)

(58) Field of Classification Search
None
See application file for complete search history.

(56) References Cited

U.S. PATENT DOCUMENTS 7,027,048 B2 *  4/2006  Brombolich .................. 345/420
7,392,163 B1 *  6/2008  Bindeman .......................... 703/2
(Continued)

FOREIGN PATENT DOCUMENTS

JP    2006-35245 A    2/2006
JP    2006-272413 A    10/2006
(Continued)

OTHER PUBLICATIONS

Matsuyama et al, "Latest Stamping Simulation Technique", New Technologies, Mitsubishi Moteors Technical Review, 2006, No. 18, pp. 126-131.*

(Continued)

*Primary Examiner* — Omar Fernandez Rivas
*Assistant Examiner* — Robert Brock
(74) *Attorney, Agent, or Firm* — Birch, Stewart, Kolasch & Birch, LLP

(57) ABSTRACT

A forming simulation method of an elastic-plastic material, which includes: calculating an element equivalent nodal force vector from stress tensor using a finite element method for one or a plurality of finite elements of a target configuration of the elastic-plastic material; and calculating the total equivalent nodal force vector of areas by integrating the element equivalent nodal force vector for the calculated one or more finite elements over all the areas or specified areas of the elastic-plastic material.

6 Claims, 24 Drawing Sheets

(56) References Cited

U.S. PATENT DOCUMENTS

| | | | |
|---|---|---|---|
| 2002/0177983 A1* | 11/2002 | Maker | 703/2 |
| 2003/0222871 A1* | 12/2003 | Brombolich | 345/427 |
| 2010/0241366 A1 | 9/2010 | Nonomura et al. | |

FOREIGN PATENT DOCUMENTS

| | | |
|---|---|---|
| JP | 2006-315063 A | 11/2006 |
| JP | 2007-11460 A | 1/2007 |
| JP | 2007-130670 A | 5/2007 |
| JP | 2007-130671 A | 5/2007 |
| JP | 2007-222906 A | 9/2007 |
| JP | 2007-229724 A | 9/2007 |
| JP | 2008-012570 A | 1/2008 |
| JP | 2008-18442 A | 1/2008 |
| JP | 2008-49389 A | 3/2008 |
| JP | 2008-55476 A | 3/2008 |
| JP | 2008-200709 A | 9/2008 |
| JP | 2009-172677 A | 8/2009 |
| WO | WO 2008/064920 | 7/2008 |

OTHER PUBLICATIONS

Foreign patent translation: JP 2006035245 A, Feb. 2006, Japan, Ando T; Yukawa Y.*

Narkeeran Narasimhan, Michael Lovell, Predicting springback in sheet metal forming: an explicit to implicit sequential solution procedure, Finite Elements in Analysis and Design, vol. 33, Issue 1, Aug. 15, 1999, pp. 29-42, ISSN 0168-874X, http://dx.doi.org/10.1016/S0168-874X(99)00009-8.*

M.G. Lee, J.H. Kim, K. Chung, S.J. Kim, R.H. Wagoner, H.Y. Kim, Analytical springback model for lightweight hexagonal close-packed sheet metal, International Journal of Plasticity, vol. 25, Issue 3, Mar. 2009 (online Apr. 2008), pp. 399-419, ISSN 0749-6419, http://dx.doi.org/10.1016/j.ijplas.2008.04.005.*

T. Meinders, I.A. Burchitz, M.H.A. Bonte, R.A. Lingbeek, Numerical product design: Springback prediction, compensation and optimization, International Journal of Machine Tools and Manufacture, vol. 48, Issue 5, Apr. 2008, pp. 499-514, ISSN 0890-6955, http://dx.doi.org/10.1016/j.ijmachtools.2007.08.006.*

Sergei Alexandrov, Yeong-Maw Hwang, The bending moment and springback in pure bending of anisotropic sheets, International Journal of Solids and Structures 46 (2009) 4361-4368.*

R.H. Wagoner, M. Li, Advances in springback, in: L. Smith, F. Pourboghrat, J. Yoon, T. Stoughton (Eds.), Proceedings of Numisheet, vol. Part A, Detroit, MI, USA, 2005, pp. 209-214.*

Mehmet Firata, Bilgin Kaftanoglub, Orhan Eser, Sheet metal forming analyses with an emphasis on the springback deformation, Journal of Materials Processing Technology 196 (2008) 135-148.*

I.A. Burchitz, Improvement of Springback Prediction in Sheet Metal Forming, Thesis, Apr. 2008, 156 pages.*

Chip Cheung, Large Deformation of Textile Fabrics Using Finite Element Method, Master's Thesis, Ohio University, 1988, 106 pages.*

Lanheng Jin, Analysis and Evaluation of a Shell Finite Element with Drilling Degree of Freedom, Master's Thesis, University of Maryland, 1994, 70 pages.*

Author unknown, "Finite Element Method Handbook", edited by K. Washizu et al., Baifukan, 1981, (38 pages including translation).

International Search Report for International Application No. PCT/JP2009/063532, dated Oct. 27, 2009.

Extended European Search Report dated Mar. 5, 2012, issued in corresponding European patent application No. 09817576.3.

K. P. Li et al.; "Simulation of Springback with the Draw/Bend Test", Intelligent Processing and Manufacturing of Materials, 1999; Proceedings of the Second International Conference in Honolulu, HI; USA Jul. 10-15, 1999; Piscataway, NJ; USA; IEEE; US; vol. 1; Jul. 10, 1999; pp. 91-104.

European Office Action, dated Aug. 21, 2017, for corresponding European Application No. 09817576.3.

Tschätsch, "Metal Forming Practise: Processes—Machines—Tools—Chapter 7—Embossing," May 17, 2005, pp. 212-217, XP055398225.

Ueda et al., "Measuring Method for Residual Stresses in Explosively Clad Plates and a Method of Residual Stress . . . ," Transactions of the ASME. Journal of Engineering Materials and Technology, vol. 118, No. 4, Oct. 1996, pp. 576-582 (Total 8 pages), XP055397743, DOI: 10.1115/1.2805959.

Wagoner et al., "Springbuck," ASM Handbook, vol. 14B, Metalworking; Sheet Forming, Feb. 2, 2006, pp. 1-23, XP055398036.

* cited by examiner

Mx → Dz

My → Dz

FORMING SIMULATION METHOD, FORMING SIMULATOR, PROGRAM AND RECORDING MEDIUM THEREFOR, AND SIMULATION-BASED FORMING METHOD

TECHNICAL FIELD OF THE INVENTION

The present invention relates to forming simulation method, forming simulator, program and a recording medium therefor and a simulation-based forming method. More particularly, the present invention relates to forming simulation of elastic-plastic materials such as steel sheets, and aluminum sheets, and plastic materials and composite materials, and a simulation-based forming method.

Priority is claimed on Japanese Patent Application Nos. 2008-252730, filed Sep. 30, 2008, and 2008-253278, filed Sep. 30, 2008, the content of which is incorporated herein by reference.

BACKGROUND ART

Automobile parts and home electric product parts have often been press-formed from thin metal sheets, such as steel sheets and aluminum sheets, to a predetermined configuration using upper and lower tools having projections and indentations. Recently, materials of higher strength and reduced thickness have been employed in order to provide lightweight press-formed products. When such high-strength materials are press-formed, however, the materials may be elastically deformed and a product having a configuration different from a configuration at a bottom dead point of the tool may often be provided. When such springback (i.e., elastic recovery) is large in amount, part precision may decrease. In order to avoid decrease in part precision, the springback amount is usually reduced by modifying the product configuration to increase stiffness. The tool configuration is usually modified in advance expecting the springback amount.

Since press-formed products usually have complicated configurations, they are not uniformly distorted during forming. It is therefore not easy to specify springback-inducing areas. In order to address this problem, the following Patent Documents 1 to 3 disclose methods of specifying areas responsible for occurrence of springback. In the methods, the product is divided into plural areas on the basis of stress distribution at the bottom dead point of the tool in the product of interest, i.e., a target configuration of the product of interest. The springback is analyzed while stress in each area is changed sequentially. The methods disclosed in Patent Documents 1 to 3 use a finite element method described in Non-patent Document 1.

Patent Documents 4 to 7 disclose methods of controlling inner residual stress that may cause springback. In the disclosed methods, embossed portions and projections are previously formed at specified areas corresponding to characteristic product configurations, which embossed portions and projections will be flattened in the next step. Patent Document 8 discloses a method of forming embossed portions and projections in the entire surface of a raw material (i.e., a blank) which will be flattened in the next step.

RELATED ART DOCUMENT

Patent Documents

[Patent Document 1] Japanese Unexamined Patent Application, First Publication No. 2007-229724

[Patent Document 2] Japanese Unexamined Patent Application, First Publication No. 2008-49389

[Patent Document 3] Japanese Unexamined Patent Application, First Publication No. 2008-55476

[Patent Document 4] Japanese Unexamined Patent Application, First Publication No. 2006-272413

[Patent Document 5] Japanese Unexamined Patent Application, First Publication No. 2007-222906

[Patent Document 6] Japanese Unexamined Patent Application, First Publication No. 2008-12570

[Patent Document 7] Japanese Unexamined Patent Application, First Publication No. 2008-18442

[Patent Document 8] Japanese Unexamined Patent Application, First Publication No. 2006-35245

Non-Patent Document

[Non-patent Document 1] "Finite element method handbook" edited by Kyuichiro WASHIZU et. al. Baifukan, 1981

DISCLOSURE OF THE INVENTION

Problems to be Solved by the Invention

In the methods disclosed in Patent Documents 1 to 3, the product is divided into plural areas in advance. It is therefore necessary to repeat springback calculation, which is to solve large-scale simultaneous equations, for the number of divided areas. Such repeated calculation may complicate the operation to specify the springback-inducing areas. The calculation results may vary in accordance with how the product is divided (i.e., the size and the number of the divided areas). Accordingly, there is a problem that it is difficult to sufficiently specify the springback-inducing areas.

In view of the foregoing, it is a first object of the present invention to provide a forming simulation method, device, a program and a recording medium therefor which can be used for accurate forming by a simple calculation to efficiently specify springback-inducing areas during forming of a thin metal sheet in a significantly rapid and reliable manner, without requiring complicated, time-consuming calculations, such as matrix operations of large-scale simultaneous equations.

In the methods disclosed in Patent Documents 4 to 7, embossed portions or projections are formed on a web surface or a flange surface. The embossed portions or the projections have U-shaped or hat-shaped cross sections and have relatively simple configurations bending along a height direction or a longitudinal direction. The embossed portions or the projections are flattened in the next step. Actual automobile parts, however, usually have a complicated configuration with projections and indentations or openings for, for example, jointing with other parts. Accordingly, the stress or distortion during forming are not uniform in the web surface or in the flange surface, but are distributed in a complicated manner. Accordingly, the methods disclosed in Patent Documents 4 to 7 have a problem that effects of embossing are not exhibited in accordance with the locations of the embossed portions or that springback may be increased.

The method disclosed in Patent Document 8 also has a problem of increased forming force in order to crush the embossed portions on the entire blank surface. Compressive stress occurs when the embossed portions are flattened, which may become a driving force that may increase springback. Even if the methods disclosed in Patent Documents 4 to 7 and the method disclosed in Patent Document 1 are combined, springback during press-forming of a press-formed product having a complicated configuration has not been sufficiently avoided.

In view of the foregoing, it is a second object of the present invention to provide a forming method excellent in dimensional accuracy by, with respect to a press-formed product having a complicated configuration, efficiently specifying areas that induce springback during press forming and controlling the springback occurring in these areas.

Means for Solving the Problem

The present invention has the following aspects in order to solve the foregoing problems.

(1) A simulation method of an elastic-plastic material forming according to an embodiment of the present invention includes: calculating an element equivalent nodal force vector from a stress tensor using a finite element method for one or a plurality of finite elements of a target configuration of the elastic-plastic material; and calculating a total equivalent nodal force vector of areas by integrating the element equivalent nodal force vector for the calculated one or a plurality finite elements over all the areas or specified areas of the elastic-plastic material.

(2) The forming simulation method of (1) may further include: specifying, among all the areas or specified areas of the elastic-plastic material, areas having a large element equivalent nodal force vector as springback-inducing areas, referring to the calculated total equivalent nodal force vector.

(3) The forming simulation method of (1) may include: calculating an inverse matrix of an overall stiffness matrix; and multiplying the inverse matrix of the overall stiffness matrix by the total equivalent nodal force vector, using the total equivalent nodal force vector as an external force vector, and calculating a contribution of each component of the external force vector with respect to a displaced amount of a specified position of the elastic-plastic material.

(4) The forming simulation method of (3) may further include: displaying the contribution of each component of the external force vector with respect to a displaced amount of the specified position of the elastic-plastic material.

(5) The forming simulation method of (1) may further include: calculating an inverse matrix of an overall stiffness matrix; multiplying the inverse matrix of the overall stiffness matrix by a first external force vector, using the total equivalent nodal force vector as the first external force vector, and calculating a first displaced amount of a specified position of the elastic-plastic material; for one or a plurality of finite elements, subtracting an element equivalent nodal force vector of the element from the first external force vector, and using an obtained subtraction result as a second external force vector, and multiplying the inverse matrix of the overall stiffness matrix by the second external force vector, and calculating a second displaced amount at a specified position of the elastic-plastic material; and for the one or plurality of finite elements, calculating an amount of change between the first displaced amount and the second displaced amount.

(6) The forming simulation method of (5) may further include: displaying the amount of change between the first displaced amount and the second displaced amount.

(7) In a forming method of an elastic-plastic material according to an embodiment of the present invention, an elastic-plastic material is produced based on a result of the simulation method of (1).

(8) The forming method of the elastic-plastic material of (7) may include: specifying springback-inducing areas based on the simulation method; forming embossed portions in advance at the springback-inducing areas; and plastically-deforming the embossed portions so as to impart compressive stress.

(9) In the forming method of the elastic-plastic material of (8), the embossed portions formed in the forming the embossed portions are two or more circular embossed portions having substantially identical dimensions.

(10) In the forming method of the elastic-plastic material of (9), the forming the embossed portions may further include adjusting height dimension of configurations of the embossed portions using a plurality of removable inner-tools having different height dimensions which are configured to be fit into recesses provided in a tool.

(11) A program according to an embodiment of the present invention is a program which causes a computer to execute forming simulation of an elastic-plastic material, the forming simulation including: calculating an element equivalent nodal force vector from stress tensor using a finite element method for one or a plurality of finite elements of a target configuration of the elastic-plastic material; and calculating a total equivalent nodal force vector of areas by integrating the element equivalent nodal force vector for the calculated one or plurality of finite elements over all the areas or specified areas of the elastic-plastic material

(12) The program of (11) may further cause a computer to execute: specifying, among all the areas or specified areas of the elastic-plastic material, areas having a large equivalent nodal force vector as springback-inducing areas based on the calculated total equivalent nodal force vector.

(13) The program of (12) may cause a computer to execute: calculating an inverse matrix of an overall stiffness matrix; and multiplying the inverse matrix of the overall stiffness matrix by the total equivalent nodal force vector with the total equivalent nodal force vector being an external force vector, and calculating contribution of each component of the external force vector with respect to a displaced amount of a specified position of the elastic-plastic material.

(14) The program of (11) may further cause a computer to execute: calculating an inverse matrix of an overall stiffness matrix; multiplying an inverse matrix of the overall stiffness matrix by a first external force vector, the total equivalent nodal force vector being the first external force vector, and calculating a first displaced amount of the specified position of the elastic-plastic material; multiplying the inverse matrix of the overall stiffness matrix by a second external force vector and calculating a second displaced amount at a specified position of the elastic-plastic material for one or a plurality of finite elements with a result obtained by subtracting an element equivalent nodal force vector of the element from the first external force vector being the second external force vector; and calculating an amount of change in the first displaced amount and the second displaced amount for one or plurality of finite elements.

(15) A computer-readable recording medium according to an embodiment of the present invention has the program of (11) recorded therein.

(16) A forming simulator which performs forming simulation of an elastic-plastic material according to an embodiment of the present invention includes a first calculator which calculates an element equivalent nodal force vector from stress tensor using a finite element method for one or a plurality of finite elements of a target configuration of the elastic-plastic material; a second calculator which calculates a total equivalent nodal force vector of areas by integrating the element equivalent nodal force vector for the calculated one or plurality of finite elements over all the areas or specified areas of the elastic-plastic material; a third calculator which calculates an inverse matrix of an overall stiffness matrix; a fourth calculator which multiplies an inverse matrix of the overall stiffness matrix by a first external force vector, the total equivalent nodal force vector being the first external force vector, and calculates a first displaced amount of the specified position of the elastic-plastic material; a fifth calculator which multiplies the inverse matrix of the overall stiffness matrix by a second external force vector and calculates a second displaced amount at a specified position of the elastic-plastic material for one or a plurality of finite elements with a result obtained by subtracting an element equivalent nodal force vector of the element from the first external force vector being the second external force vector; and a sixth calculator which calculates an amount of change in the first displaced amount and the second displaced amount for one or plurality of finite elements.

EFFECTS OF THE INVENTION

According to the aspects (1) and (2) of the present invention, springback-inducing areas during forming of the elastic-plastic material can be specified by a simple calculation instead of complicated and time-consuming calculation, such as a matrix operation of large-scale simultaneous equations. As a result, accurate forming can be provided.

According to the aspects (3) and (4) of the present invention, springback-inducing areas during forming of the elastic-plastic material are specified still more reliably than in the present inventions (1) and (2), and accurate forming can be provided.

According to the aspects (5) and (6) of the present invention, springback-inducing areas during forming of the elastic-plastic material are specified still more reliably than in the aspects (3) and (4), and accurate forming can be provided.

According to aspects (7) to (10) of the present invention, on the basis of the results of the simulation methods recited in (1) to (6), even if the product to be processed has a complicated configuration, springback-inducing areas during press-forming can be efficiently specified as a pinpoint manner and springback induced in the areas are controlled so that a forming method of an elastic-plastic material excellent in dimensional accuracy can be provided.

EMBODIMENTS OF THE INVENTION

Hereinafter, embodiments of the present invention will be described with reference to press forming simulation of thin metal sheets. Applications of the present invention, however, are not limited to press forming simulation of thin metal sheets. The present invention can also be applied to, for example, forming simulation of elastic-plastic materials, such as plastic materials and composite materials, and roll forming.

Referring now to FIGS. 1 to 8, a first embodiment of the present invention will be described in detail.

Figure 1:
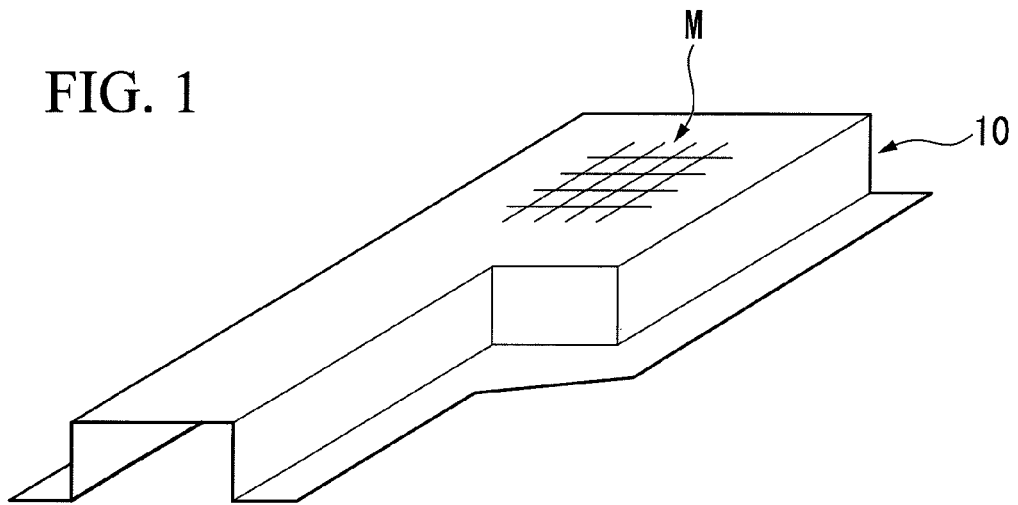
FIG. 1 is a schematic perspective view of an exemplary forming target configuration of a thin metal sheet of interest for forming simulation (i.e., a configuration at the bottom dead point of the forming) according to the present embodiment.

FIG. 1 is a schematic perspective view of an exemplary configuration at a bottom dead point of the tool of a thin metal sheet of interest for forming simulation (i.e., a forming target configuration) according to an embodiment of the present invention.

Figure 2:
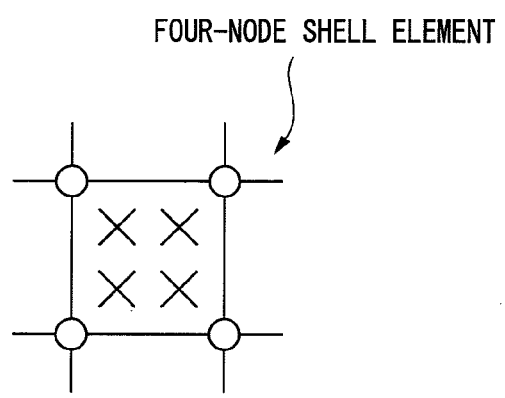
FIG. 2 is a schematic diagram of a four-node shell element.

FIG. 1 includes a mesh area M representing a finite element on a thin metal sheet 10. A four-node shell element as illustrated in FIG. 2 is used herein as the finite element. The four-node shell element has six degrees of freedom with each node being referred to in a global coordinate system as represented by the following Equation (1). Each integration point has three components of plane stress as represented by the following Equation (2). Although not illustrated, the integration points are located in several layers (five in the present embodiment) in a thickness direction of the thin metal sheet.

$$\text{Degree of freedom of nodes: } \{u\ v\ w\ \theta_x\ \theta_y\ \theta_z\} \quad (1)$$

$$\text{Integration point stress tensor: } \{\sigma\} = \begin{Bmatrix} \sigma_{xx} \\ \sigma_{yy} \\ \tau_{xy} \end{Bmatrix} \quad (2)$$

First, an element equivalent nodal force vector for each finite element is calculated using the following Equation (3). Although the element equivalent nodal force vector is calculated for each finite element herein, the element equivalent nodal force vector may alternatively be calculated for each group of finite elements consisting of plural finite elements.

$$\text{Element equivalent nodal vector: } \{f\}_e = \int_{V_e} [L]^t [B]^t \{\sigma\} dV = \begin{Bmatrix} \vdots \\ N_x^i \\ N_y^i \\ N_z^i \\ M_x^i \\ M_y^i \\ M_z^i \\ \vdots \end{Bmatrix} \quad (3)$$

In Equation (3), [L] represents a coordinate transform matrix and [B] represents a relationship matrix between displacement and strain. The coordinate transform matrix [L] is a transformation matrix for converting the element equivalent nodal force vector in an element coordinate system into a vector in a global coordinate system. The coordinate transform matrix [L] is calculated by using a direction cosine with respect to an element coordinate system (X', Y' and Z') of the X-, Y- and Z-axes of the global coordinate system. The relationship matrix between displacement and strain [B] changes depending on the type of the finite element to be used. Regarding this, formulization to various finite elements is described in, for example, Non-patent Document 1.

Subsequently, as represented in the following Equation (4), an element equivalent nodal force vector $\{f\}_e$ calculated for each element is integrated with respect to all the areas of the thin metal sheet to obtain a total equivalent nodal force vector $\{f\}$. Although integration is carried out for all the areas of the thin metal sheet in the present embodiment, only specified areas (e.g., areas having especially complicated configurations) of the thin metal sheet may alternatively be integrated to obtain a total equivalent nodal force vector of the specified areas.

$$\text{Total equivalent nodal vector: } \{f\} = \int_V \{f\}_e dV \quad (4)$$

The calculated total equivalent nodal force vector is obtained by converting stress at the bottom dead point of the tool into equivalent nodal force (i.e., internal force). The total equivalent nodal force vector consists of cross-sectional force (Nx, Ny and Nz) and bending moment (Mx, My and Mz) in the global coordinate system. The present inventors made evaluation of many exemplary products. As a result, the present inventors found that three bending moment components among the equivalent nodal force become driving force of springback. The present inventors also found that, unlike stress distribution, areas with a large amount of bending moment are localized to a limited region of a thin metal sheet.

In the first embodiment of the present invention, the areas with a large amount of bending moment are illustrated by using, for example, a contour map with respect to the bending moment of the calculated total equivalent nodal force vector on the basis of the above-described knowledge. With this configuration, springback-inducing areas can be specified pinpointedly and accurately in a significantly short time without experiencing complicated operations, such as solving large-scale simultaneous equations.

(Forming Simulator According to the First Embodiment)

Figure 3:
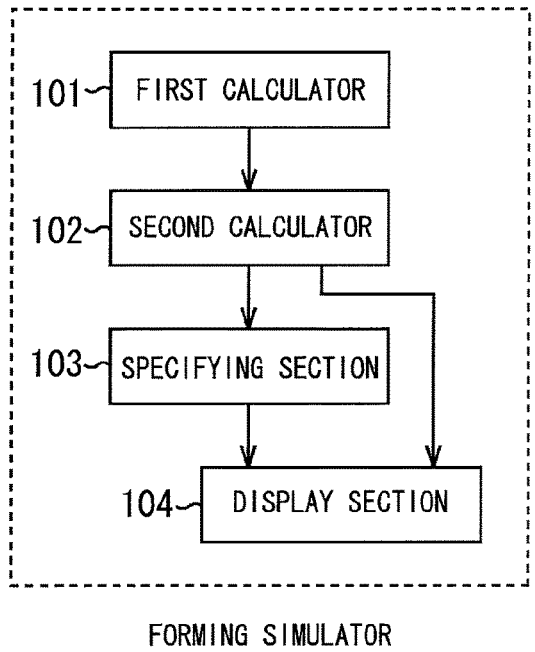
FIG. 3 is a block diagram schematically illustrating a configuration of a forming simulator according to the first embodiment.

FIG. 3 is a block diagram schematically illustrating a configuration of a forming simulator according to the first embodiment.

The forming simulator performs forming simulation at the bottom dead point of the tool of a thin metal sheet using the finite element method. The forming simulator includes a first calculator 101, a second calculator 102, a specifying section 103 and a display section 104. The first calculator 101 calculates each element equivalent nodal force vector. The second calculator 102 calculates the total equivalent nodal force vector. The specifying section 103 specifies springback-inducing areas in the thin metal sheet. The display section 104 displays specification results of the specifying section 103. The first calculator 101, the second calculator 102 and the specifying section 103 are embodied as, for example, functions of a central processing unit (CPU) of a computer.

The first calculator 101 solves, for example, Equation (3) on the basis of given stress tensor (see Equation (2)) and obtains the element equivalent nodal force vector for each finite element (e.g., a four-node shell element). The element equivalent nodal vector may alternatively be calculated for each group consisting of plural finite elements.

The second calculator 102 integrates the element equivalent nodal force vector for each finite element calculated by the first calculator 101 with respect to all the areas of the thin metal sheet (see Equation (4)) and calculates the total equivalent nodal force vector. Although the element equivalent nodal force vector is integrated for all the areas herein, the element equivalent nodal force vector may alternatively be integrated only for predetermined areas, such as areas with complicated configurations.

Regarding bending moment (Mx, My and Mz) of the components of the calculated total equivalent nodal force vector calculated by the second calculator 102, the specifying section 103 specifies positions of areas with a large amount of bending moment among the areas in the bottom dead point of the forming of the thin metal sheet as springback-inducing areas in the thin metal sheet.

In order to specify the position with a large amount of bending moment, for example, the amount of the bending moment of each area is compared with a predetermined threshold. Then, an area with an amount of bending moment that exceeds the threshold is specified as springback-inducing areas in the thin metal sheet. Alternatively, several different thresholds may be prepared in advance and may be selected suitably for use.

The display section 104 displays the amount of bending moment as, for example, an image corresponding to a configuration of the thin metal sheet. In particular, the entire image of the thin metal sheet is colored in accordance with the amount of moment so that a user can recognize springback-inducing areas having a large amount of moment.

Additionally or alternatively, the display section 104 may have a function to graphically display specification results of the specifying section 103 corresponding to the configuration of the thin metal sheet.

(Forming Simulation Method According to the First Embodiment)

A forming simulation method using the foregoing forming simulator will be described below.

Figure 4:
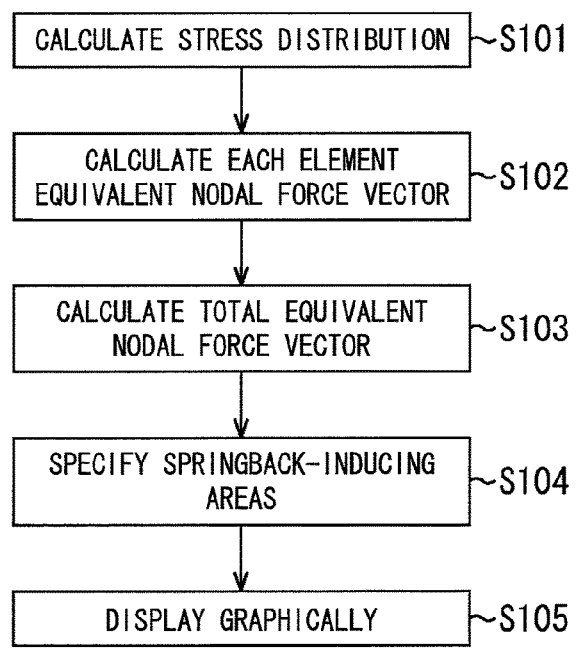
FIG. 4 is a flowchart of a forming simulation method according to the first embodiment illustrated step by step.

FIG. 4 is a flowchart of the forming simulation method according to the first embodiment illustrated step by step.

Figure 5A:
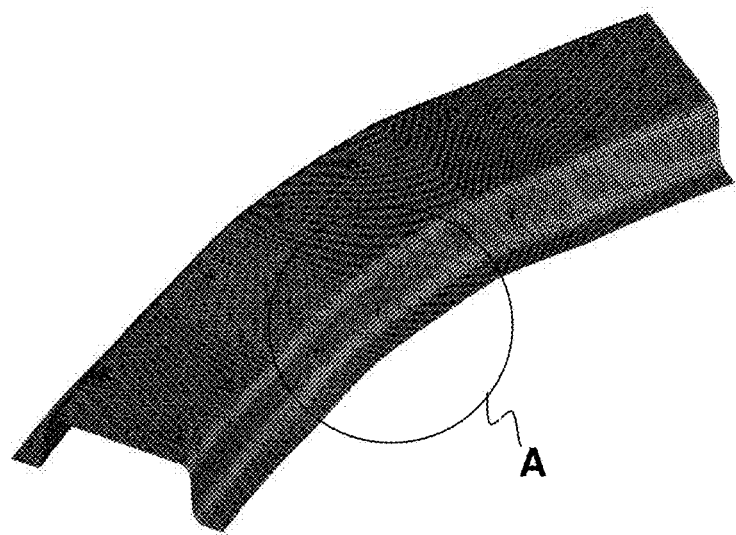
FIG. 5A is a schematic diagram of a metal product (i.e., a high-tensile steel sheet) used in the first embodiment.
Figure 5B:
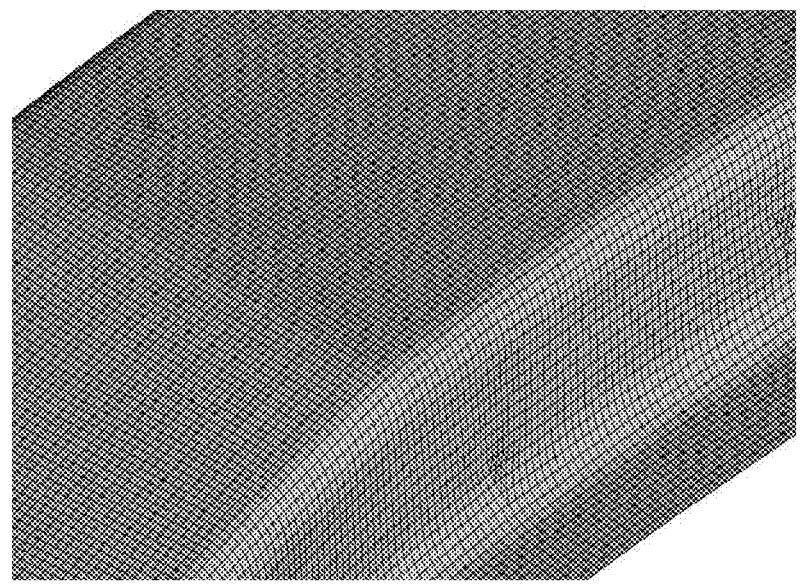
FIG. 5B is an enlarged view of portion A in FIG. 5A.

A metal product (i.e., a high-tensile steel sheet) illustrated in FIGS. 5A and 5B is employed as a thin metal sheet for forming simulation in the present embodiment. The metal product is illustrated as an overview in FIG. 5A and a partially enlarged view in FIG. 5B.

First, stress distribution (i.e., stress tensor) at the bottom dead point of the tool of the metal product is calculated (step S101).

The stress distribution at the bottom dead point of the tool is calculated using, for example a commercially-available forming simulation program (PAM-STAMP available from Nihon ESI K.K.). Main analysis conditions for the forming simulation according to the first embodiment are shown in the following Table 1.

TABLE 1

| Item | Analysis condition |
|---|---|
| Material | High-tensile steel sheet (JAC980Y) |
| Plate thickness | 1.2 mm |

TABLE 1-continued

| Item | Analysis condition |
|---|---|
| Forming method | One step forming |
| Number of elements | 31,712 |
| Number of nodes | 31,997 |
| Element used | Four-node shell element (reduced-integrated element: 1 integration point in plane × 5 integration points in thickness direction) |

Figure 6:
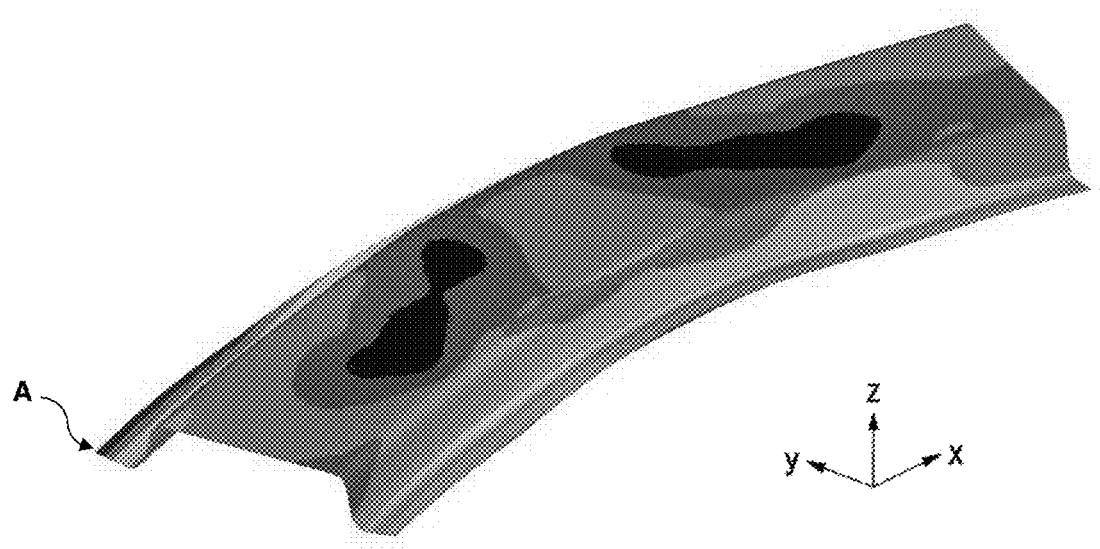
FIG. 6 is a schematic diagram illustrating distribution of a displaced amount of springback obtained by forming simulation after the metal product is released.

Distribution of the displaced amount caused by springback obtained by forming simulation after the product is released is illustrated in FIG. 6. The displaced amount is illustrated by contour lines in accordance with displayed density. The highest density indicates the largest displaced amount. As illustrated in FIG. 6, the displaced amount in a direction of the Z-axis at a point A is especially large, which indicates that the metal product is warped and distorted at the point A.

Subsequently, the first calculator 101 solves, for example, Equation (3) on the basis of the stress tensor obtained in step S101 and the element equivalent nodal force vector is calculated for each finite element (e.g., the four-node shell element) or for plural finite elements (step S102).

Subsequently, the second calculator 102 integrates the element equivalent nodal force vector for each or plural finite elements calculated by the first calculator 101 with respect to all the areas or specified areas of the thin metal sheet and calculates the total equivalent nodal force vector of the areas (step S103).

Subsequently, regarding bending moment (Mx, My and Mz) of the components of the total equivalent nodal force vector calculated by the second calculator 102, the specifying section 103 specifies positions of areas with a large amount of bending moment among the areas at the bottom dead point of the tool in the thin metal sheet as springback-inducing areas in the thin metal sheet (step S104).

The display section 104 then displays the amount of bending moment as, for example, an image corresponding to a configuration of the thin metal sheet (step S105). Although step S105 herein follows step S104, step S105 may alternatively precede step S104. Step S104 may also be omitted.

In addition to or alternative to the graphic display of the amount of bending moment in step S105, the specification results of the specifying section 103 may be displayed as an image.

Figure 7A:
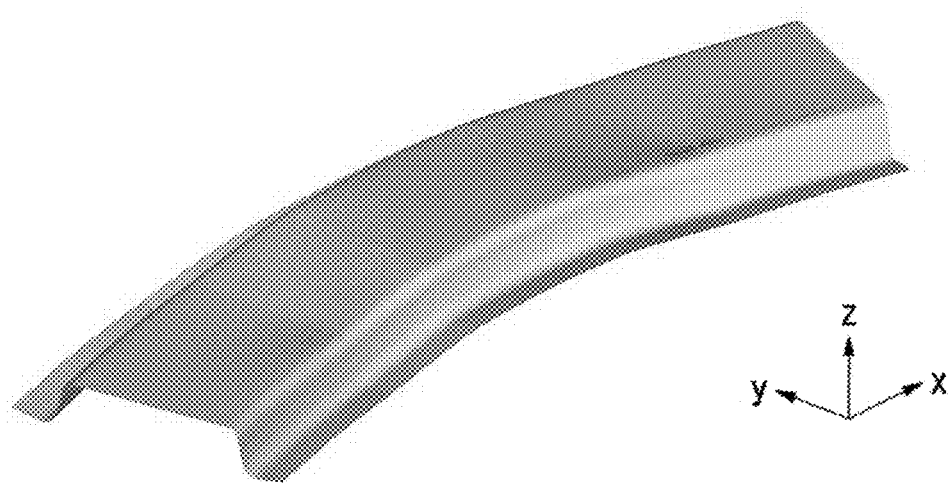
FIG. 7A is a schematic diagram of an exemplary graphic display of a display section according to the first embodiment.
Figure 7B:
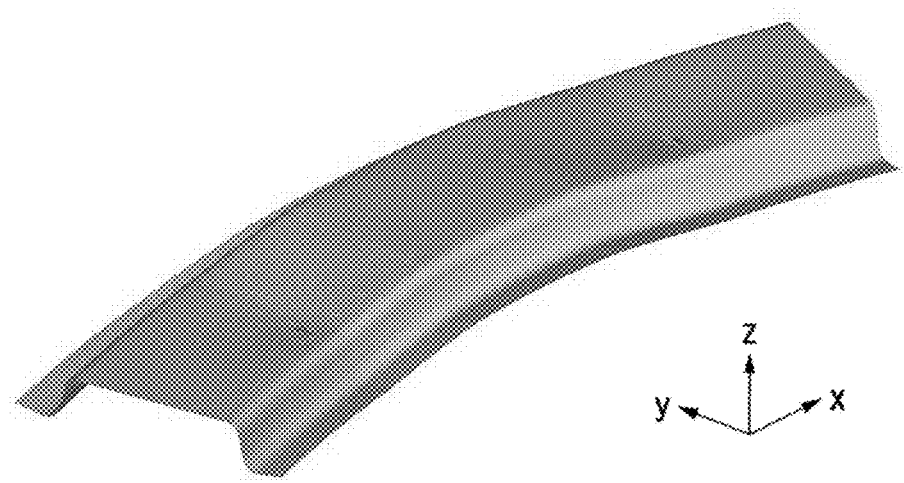
FIG. 7B is a schematic diagram of an exemplary graphic display of the display section according to the first embodiment.

An exemplary graphic display of the amount of bending moment by the display section 104 is illustrated in FIGS. 7A and 7B. Bending moment Mx about the X-axis is illustrated in FIG. 7A and bending moment My about the Y-axis is illustrated in FIG. 7B. The amount of the bending moment is illustrated by contour lines in accordance with displayed density. The higher density indicates the greater amount of bending moment. The amount of bending moment of the metal product is localized as illustrated in the drawings. In FIGS. 7A and 7B, two areas are specified as the springback-inducing areas.

As a comparative example of the first embodiment, a metal product identical to that of the first embodiment 1 was subject to forming simulation using the technique disclosed in Patent Document 3.

Here, the metal product is divided into plural areas on the basis of the stress distribution obtained in step S101. High-stress areas are sequentially released (i.e., the stress is reduced to zero). Then the divided areas are subject to springback analysis (i.e., tool restraint is released and the deformation amount caused by elastic recovery is calculated) to specify areas with a larger deformation amount.

Figure 8:
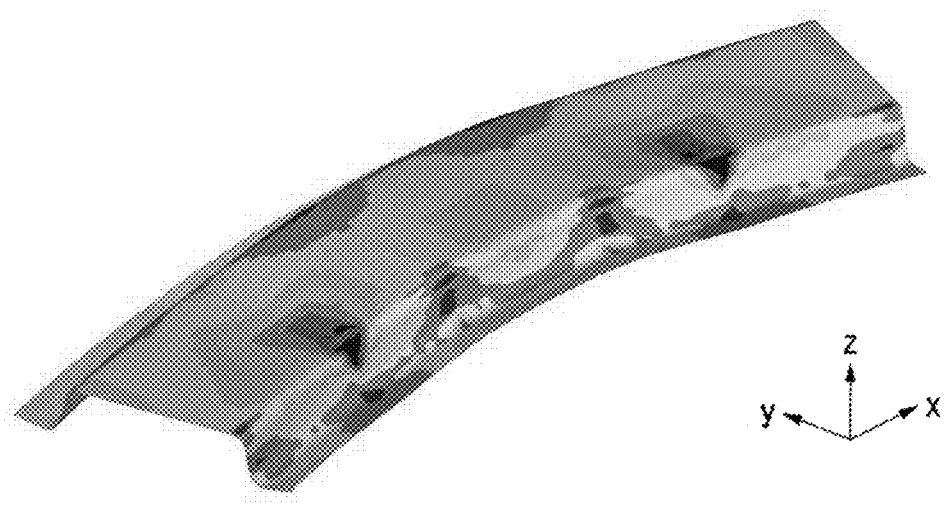
FIG. 8 is a schematic diagram of deformation results of a metal product according to a comparative example of the first embodiment.

The result of the comparative example (i.e., the major principal stress in the center of the plate thickness) is illustrated in FIG. 8. The stress is illustrated by contour lines in accordance with displayed density. The higher density indicates the larger stress. As illustrated in FIG. 8, plural areas with a large amount of stress are widely distributed. It is thus difficult to specify springback-inducing areas accurately. Since the display result depends on how the areas are divided, it is difficult to display the deformation amount accurately.

In the first embodiment, as illustrated in FIGS. 7A and 7B, as compared with that illustrated in FIG. 8, the bending moment Mx about the X-axis and the bending moment My about the Y-axis are locally high in a positive/negative pair in a portion of a ridgeline of the metal product. It is easily understood that the bending moment in these areas has significant influence on the springback amount. If the areas having significant influence can be specified, the product configuration in the areas can be modified slightly. It is therefore possible to efficiently reduce springback and to improve dimensional accuracy of the press-formed product.

As described above, according to the first embodiment, springback-inducing areas during forming of the metal sheet can be specified by a simple calculation instead of complicated and time-consuming calculation, such as a matrix operation of large-scale simultaneous equations. As a result, accurate forming can be provided.

Referring now to FIGS. 9 to 14, a second embodiment of the present invention will be described in detail.

First, a total equivalent nodal force vector $\{f\}$ is calculated as in the first embodiment regarding the finite element set in the thin metal sheet 10 using Equations (1) to (4). The total equivalent nodal force vector $\{f\}$ is represented as an external force vector, as illustrated in the following Equation (5) using a stiffness matrix [K] and specific nodal displacement ($u_i$) in order to estimate springback.

$$[K]\{u\}=\{f\} \quad (5)$$

Then, after suitable constraint conditions are given, an inverse matrix $[K]^{-1}$ of the stiffness matrix [K] is calculated by an ordinary method. The springback amount (u) of the entire product can be obtained as represented in the following Equation as an ordinary method.

$$\{u\}=[K]^{-1}\{f\} \quad (6)$$

The specific nodal displacement ($u_i$) for evaluation of springback can be calculated as represented in the following Equation.

$$\begin{Bmatrix} \vdots \\ u_i \\ \vdots \end{Bmatrix} = \begin{bmatrix} \vdots & \cdots & \vdots \\ k_{i1}^{-1} & \cdots & k_{iN}^{-1} \\ \vdots & \cdots & \vdots \end{bmatrix} \begin{Bmatrix} f_1 \\ \vdots \\ f_N \end{Bmatrix} \quad (7)$$

$$u_i = \sum_{j=1}^{N} k_{ij}^{-1} f_j$$

The present inventors have found that $(k^{-1}_{ij} f_j)$ in sigma in Equation (7) represents contribution (displacement) for each external force vector component ($f_j$) with respect to the displaced amount ($u_i$) caused by springback at a specified position. That is, it is understood that, if the external force vector component has the same direction (i.e., has the same sign) as that of the springback displacement at the specified position and has a greater absolute value, the external force vector component has greater positive contribution with respect to the springback displacement at the specified position (springback is promoted). If the external force vector component has a reverse direction (i.e., has a different sign) to that of the springback displacement at the specified position, the external force vector component has negative contribution with respect to the springback displacement at the specified position (springback is suppressed). If the external force vector component has a smaller absolute value, the external force vector component has smaller contribution to the springback displacement at the specified position. Accordingly, springback-inducing areas can be specified efficiently by displaying the nodal amount as the contribution of the external force vector component with respect to the displaced amount of the specified position, without repeating complicated and time-consuming calculation, such as a matrix operation of large-scale simultaneous equations.

(Forming Simulator According to the Second Embodiment)

Figure 9:
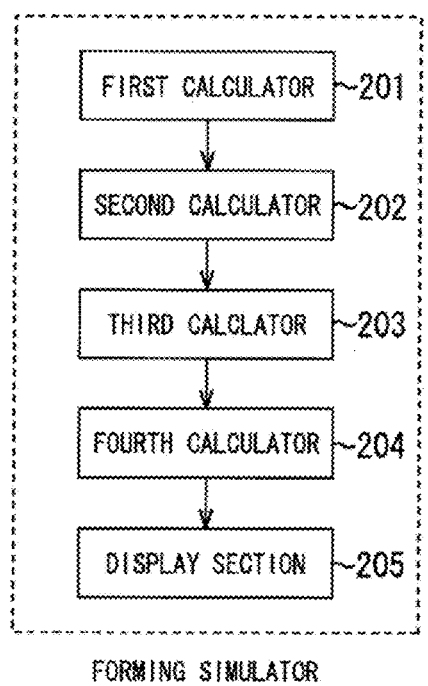
FIG. 9 is a block diagram schematically illustrating a configuration of a forming simulator according to the second embodiment.

FIG. 9 is a block diagram of a schematic structure of the forming simulator according to the second embodiment.

The forming simulator carries out forming simulation at the bottom dead point of the tool of the thin metal sheet using a finite element method. The forming simulator includes a first calculator 201, a second calculator 202, a third calculator 203, a fourth calculator 204 and a display section 205. The first calculator 201 calculates each element equivalent nodal force vector. The second calculator 202 calculates the total equivalent nodal force vector. The third calculator 203 calculates an inverse matrix of the overall stiffness matrix. The fourth calculator 204 multiplies the total equivalent nodal force vector by the inverse matrix of the overall stiffness matrix with the total equivalent nodal force vector being the external force vector. The display section 205 displays calculation results of the fourth calculator 204. The first to the fourth calculators 201 to 204 are embodied as, for example, functions of a central processing unit (CPU) of a computer.

The first calculator 201 solves, for example, Equation (3) on the basis of the given stress tensor (see Equation (2)) and calculates the element equivalent nodal force vector for each finite element (e.g., a four-node shell element) or for plural finite elements. The second calculator 202 integrates the element equivalent nodal force vector for each finite element (or for plural finite elements) calculated by the first calculator 201 with respect to all the areas of the thin metal sheet (see Equation (4)) and calculates the total equivalent nodal force vector.

The third calculator 203 calculates the inverse matrix of the overall stiffness matrix. The overall stiffness matrix is obtained by using a relationship matrix between displacement and strain corresponding to the foregoing various finite elements, a relationship matrix between stress and strain based on a general linear elasticity constitutive law and a coordinate transform matrix, as described in, for example, Non-patent Document 1. The inverse matrix can be obtained by an ordinary calculation method.

The fourth calculator 204 multiplies the inverse matrix of the overall stiffness matrix by the total equivalent nodal force vector with the total equivalent nodal force vector being the external force vector (see Equations (5) to (7)). In the multiplication, $(k^{-1}_{ij} f_j)$ in sigma in Equation (7) represents contribution of each component of the external force vector. The displaced amount caused by springback at the specific position obtained by the multiplication represents the sum of each contribution.

The display section 205 displays contribution of each component of the external force vector with respect to the displaced amount at the specific position of the thin metal sheet acquired by the fourth calculator 204. In particular, the contribution of each external force vector is colored with respect to the specific position of the thin metal sheet, for example, so that a user can recognize the springback-inducing area corresponding to the specific position.

(Forming Simulation Method According to the Second Embodiment)

Hereinafter, the forming simulation method using the foregoing forming simulator will be described.

Figure 10:
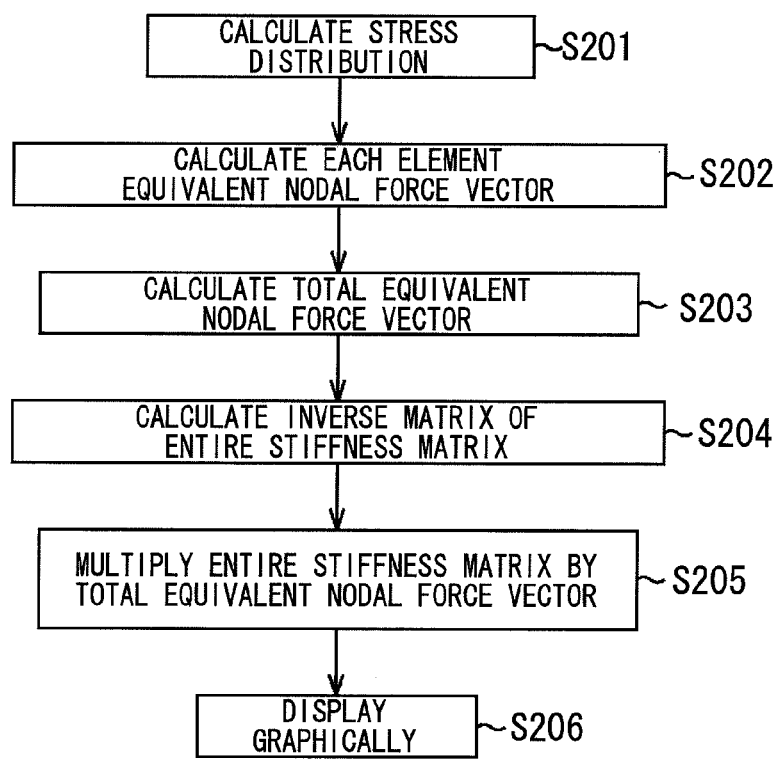
FIG. 10 is a flowchart of a forming simulation method according to the second embodiment illustrated step by step.

FIG. 10 is a flowchart of the forming simulation method according to the second embodiments illustrated step by step.

Figure 11A:
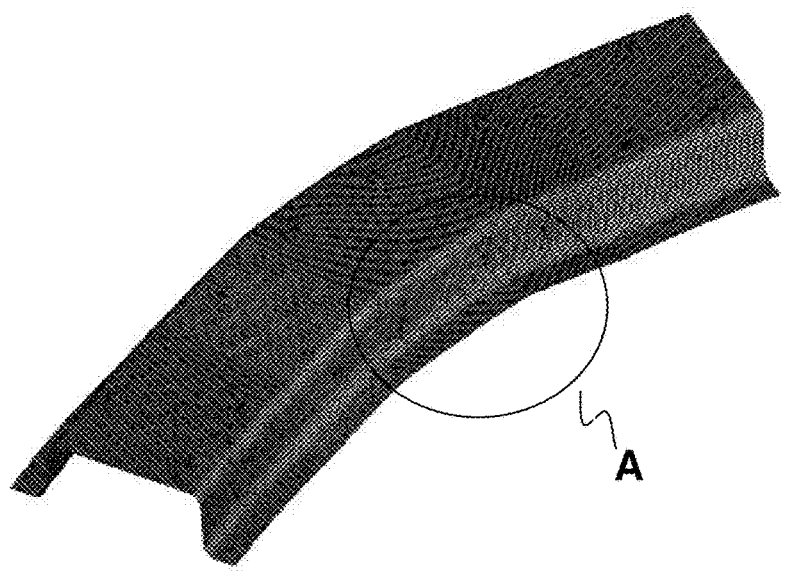
FIG. 11A is a schematic diagram of a metal product (i.e., a high-tensile steel sheet) used in the second embodiment.
Figure 11B:
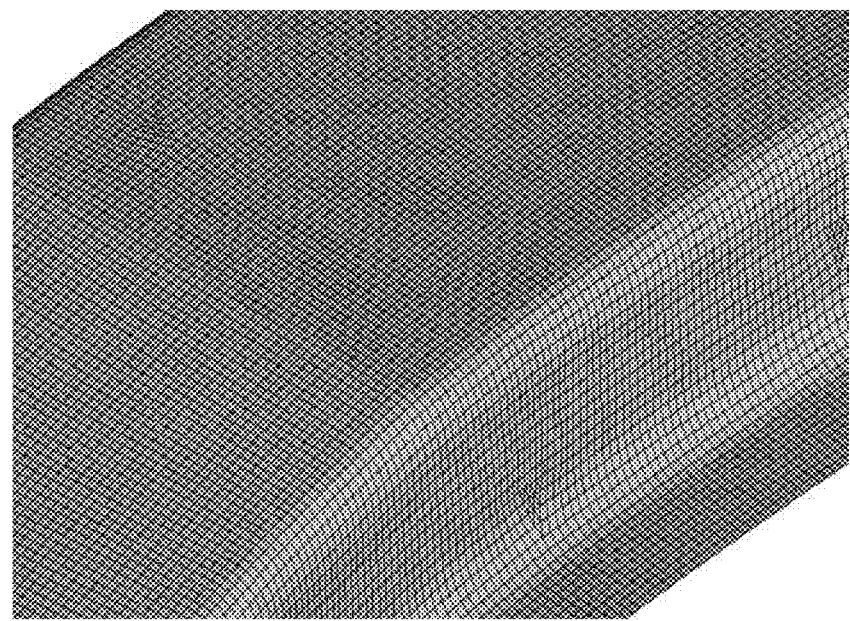
FIG. 11B is an enlarged view of portion A in FIG. 11A.

A metal product (i.e., a high-tensile steel sheet) illustrated in FIGS. 11A and 11B is employed as a thin metal sheet for forming simulation. The metal product is illustrated as an overview in FIG. 11A and a partially enlarged view in FIG. 11B.

First, stress distribution (i.e., stress tensor) at the bottom dead point of the tool for the metal product is calculated (step S201).

The stress distribution at the bottom dead point of the tool is calculated using, for example a commercially-available forming simulation program (PAM-STAMP available from Nihon ESI K.K.).

Main analysis conditions in the forming simulation according to the second embodiment are the same as those shown in Table 1 employed in the first embodiment.

Figure 12:
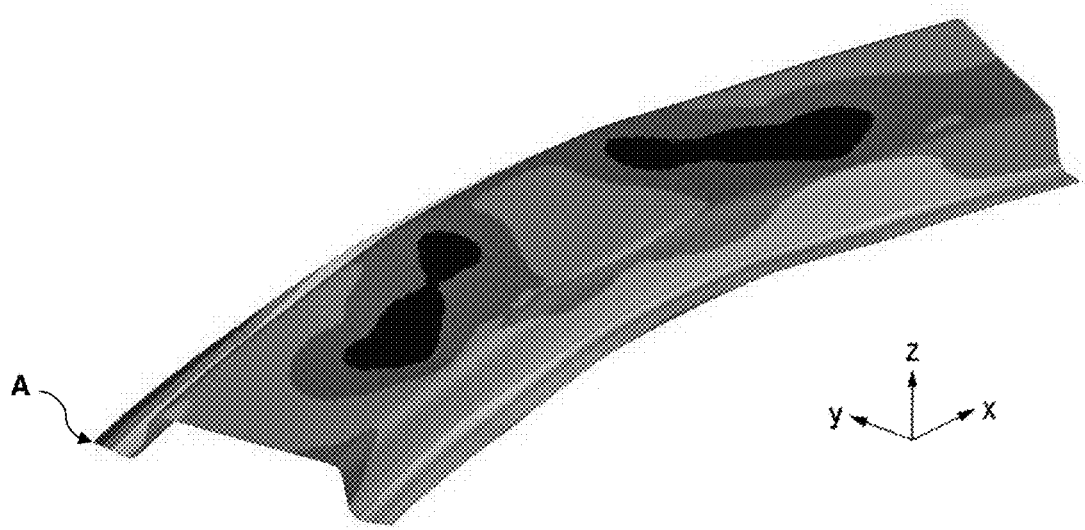
FIG. 12 is a schematic diagram illustrating distribution of a displaced amount of springback obtained by forming simulation after the metal product is released.

Distribution of the displaced amount caused by springback obtained by forming simulation after the product is released is illustrated in FIG. 12. The displaced amount is illustrated by contour lines in accordance with displayed density. The higher density indicates the larger displaced amount. As illustrated in FIG. 12, the displaced amount in a direction of the Z-axis at a point A is especially large, which indicates that the metal product is warped and distorted at the point A.

The first calculator 201 solves, for example, Equation (3) on the basis of the given stress tensor obtained in step S201 and calculates the element equivalent nodal force vector for each finite element (e.g., a four-node shell element) or for plural finite elements (step S202).

The second calculator 202 then integrates the element equivalent nodal force vector for each finite element (or for plural finite elements) calculated by the first calculator 201 with respect to all the areas of the thin metal sheet and calculates the total equivalent nodal force vector (step S203).

Then, the third calculator 203 calculates the inverse matrix of the overall stiffness matrix (step S204).

The fourth calculator 204 then multiplies the inverse matrix of the overall stiffness matrix by the total equivalent nodal force vector with the total equivalent nodal force vector being the external force vector (step S205).

The contribution of each component of the external force vector of the displaced amount caused by springback with respect to a predetermined (i.e., specified) position of the thin metal sheet is graphically displayed by the display section 205 (step S206).

Figure 13A:
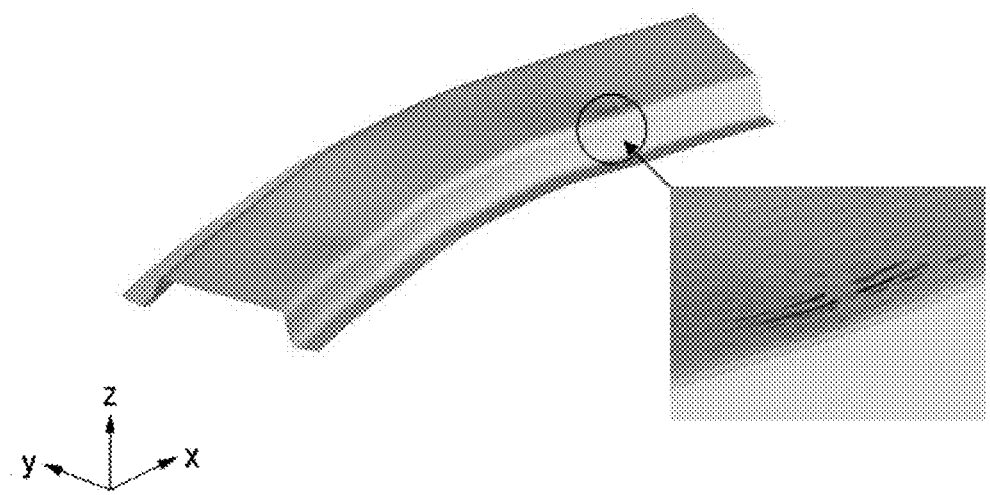
FIG. 13A is a schematic diagram of an exemplary graphic display in a display section according to the second embodiment.
Figure 13B:
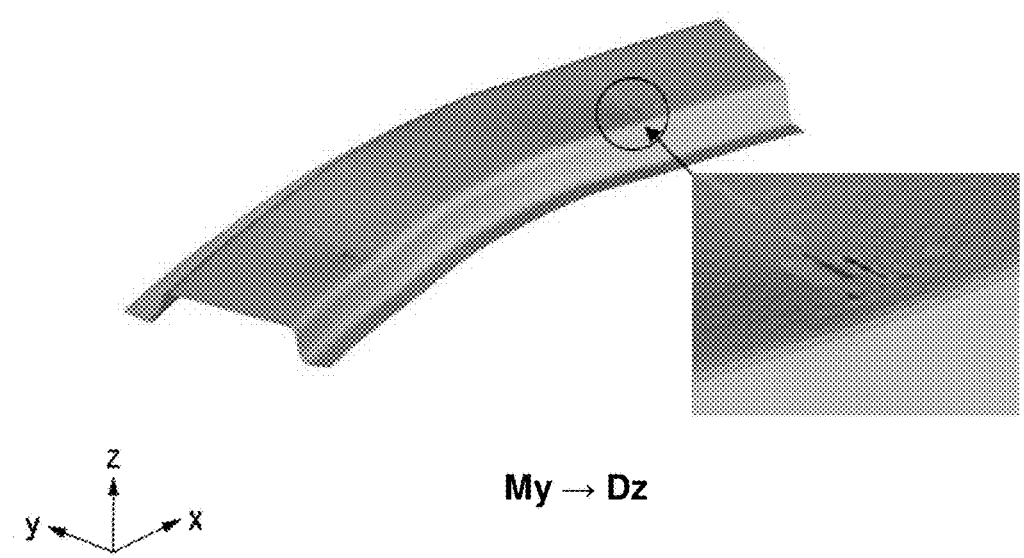
FIG. 13B is a schematic diagram of an exemplary graphic display in the display section according to the second embodiment.

An exemplary contribution of each component of the external force vector of the displaced amount caused by springback with respect to the specified position of the thin metal sheet by the display section 205 is illustrated in FIGS. 13A and 13B. Here, distribution of the contribution (Dz) of the amount of bending moment (Mx, My) which is a component of the external force vector with respect to the displacement in the direction of the Z-axis at the point A of FIG. 12 is illustrated by contour lines. The contribution (i.e., displacement) is made dimensionless by dividing the contribution by the displacement in the z direction at the point A. That is, the contribution ratio of the external force vector component with respect to the displacement at the point A is shown in the illustrated example. FIG. 13A illustrates Dz distribution of the bending moment Mx about the X-axis. FIG. 13B illustrates Dz distribution of the bending moment My about the Y-axis. In the example illustrated in FIGS. 13A and 13B, Dz is illustrated by contour lines in accordance with displayed density. The highest density indicates the largest Dz.

As a comparative example of the second embodiment, a metal product identical to that of the second embodiment was subject to forming simulation using the technique disclosed in Patent Document 3.

Here, the metal product is divided into plural areas on the basis of the stress distribution obtained in step S201. High-stress areas are sequentially released (i.e., the stress is reduced to zero). Then the divided areas are subject to springback analysis (i.e., tool restraint is released and the deformation amount caused by elastic recovery is calculated) to specify areas with a larger deformation amount.

Figure 14:
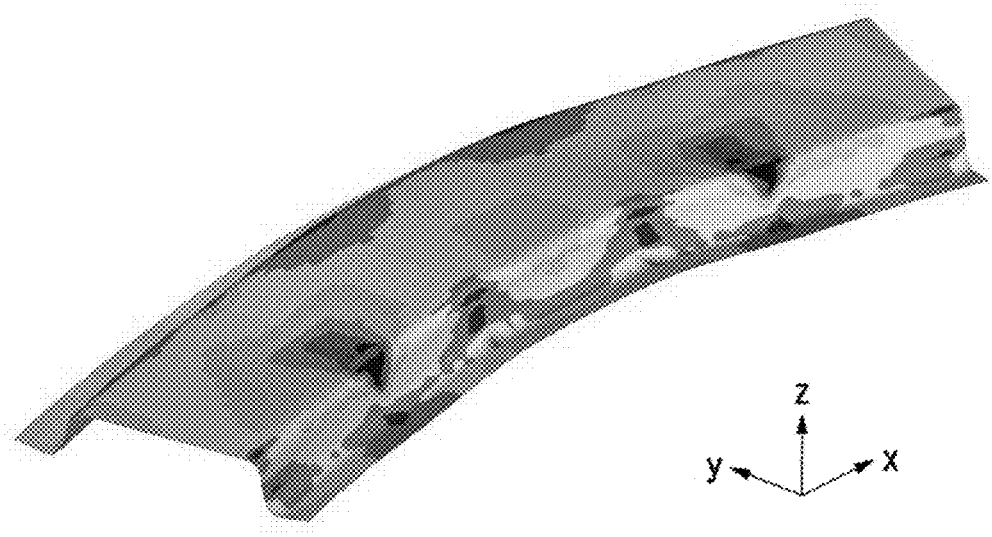
FIG. 14 is a schematic diagram of deformation results of a metal product according to a comparative example of the second embodiment.

The result of the comparative example (i.e., the major principal stress in the center of the plate thickness) is illustrated in FIG. 14. The stress is illustrated by contour lines in accordance with displayed density. The highest density indicates the largest stress. As illustrated in FIG. 14, plural areas with a large amount of stress are widely distributed. It is thus difficult to specify springback-inducing areas accurately. Since the display result depends on how the areas are divided, it is difficult to display the deformation amount accurately.

In the second embodiment, as illustrated in FIGS. 13A and 13B, as compared with that illustrated in FIG. 14, magnitude of the influence of the Dz distribution at the point A in FIG. 12 can be recognized pinpointedly and quantively. If the areas having significant influence can be specified, the product configuration in the areas can be modified slightly. It is therefore possible to efficiently reduce springback and to improve dimensional accuracy of the press-formed product.

As described above, according to the second embodiment, springback-inducing areas during forming of the thin metal sheet can be specified by a simple calculation instead of complicated and time-consuming calculation, such as a matrix operation of large-scale simultaneous equations. As a result, accurate forming can be provided.

Referring now to FIGS. 15 to 20, a third embodiment of the present invention will be described in detail.

First, as in the second embodiment, regarding the finite element set in the thin metal sheet 10, specific nodal displacement ($u_i$) is calculated using Equations (1) to (7) for evaluation of springback. The specific nodal displacement for evaluation of the calculated springback is considered herein as reference first displacement ($u_i^{(1)}$).

The element equivalent nodal force vector $\{f\}_e$ calculated for each element is then subtracted from the total equivalent nodal force vector $\{f\}$ to obtain a corrected equivalent nodal force vector $\{f'\}$.

$$\text{Corrected total equivalent nodal vector: } \{f'\} = \{f\} - \{f\}_e \quad (8)$$

The element equivalent nodal force vector $\{f\}_e$ may be calculated using Equation (3) or using only specific components, for example, in-plane force and moment. Since the purpose herein is to obtain the contribution of the element with respect to springback as described later, a value obtained through scalar multiplication by a certain coefficient may be used.

Subsequently, second displacement ($u_i^{(2)}$) with respect to the specific node for evaluation of springback is obtained as represented by Equation (9) using the inverse matrix $[K]^{-1}$ obtained by using Equation (6) and the corrected equivalent nodal force vector $\{f'\}$.

$$u_i^{(2)} = \sum_{j=1}^{N} k_{ij}^{-1} f_j' \qquad (9)$$

Equations (8) and (9) are solved for each element and the amount of change in the first displacement ($u_i^{(1)}$) and the second displacement ($u_i^{(2)}$) are calculated in, for example, the following manner.

Change in displaced amount: $(u_i^{(2)} - u_i^{(1)})$ (10)

If the absolute value of the second displacement ($u_i^{(2)}$) is smaller than the absolute value of the first displacement ($u_i^{(1)}$) as represented by Equation (11), it is indicated that remaining stress of the element of interest has a function to reduce springback when released.

If the absolute value of the second displacement ($u_i^{(2)}$) is larger than the absolute value of the first displacement ($u_i^{(1)}$) as represented by Equation (12), it is indicated that the remaining stress of the element of interest has a function to increase springback.

If the absolute value of the first displacement ($u_i^{(1)}$) and the absolute value of the second displacement ($u_i^{(2)}$) are substantially same as represented by Equation (13), it is indicated that the remaining stress of the element of interest has no contribution to springback.

$|u_i^{(1)}| > |u_i^{(2)}|$ (11)

$|u_i^{(1)}| < |u_i^{(2)}|$ (12)

$|u_i^{(1)}| \approx |u_i^{(2)}|$ (13)

The springback-inducing areas can efficiently be specified by displaying, for each element, the amount of change in the first displacement ($u_i^{(1)}$) and the second displacement ($u_i^{(2)}$) which is calculated using Equation (10).

Calculations of Equations (8) and (9) are simple vector calculations including no large-scale matrix inversion operation. Accordingly, the calculations of Equations (8) and (9) have small calculation load and thus can be calculated in a short time even if the displaced amount for each element is calculated for all the elements.

The calculation method of the amount of change in the first displacement ($u_i^{(1)}$) and the second displacement ($u_i^{(2)}$) here is not limited to that represented by Equation (10). Instead, the amount of change may be calculated by, for example, a method which is made dimensionless with the first displacement, as represented by the following Equation (14).

$(u_i^{(2)}/u_i^{(1)} - 1)$ (14)

The specific nodal displacement may alternatively be represented by an arithmetic expression of the amounts of plural nodal displaced amounts, as represented by the following Equation (15) instead of using a single node.

$$\sum_{i=1}^{m} c_i u_i^{(j)} (j = 1, 2) \qquad (15)$$

(Forming Simulator According to the Third Embodiment)

Figure 15:
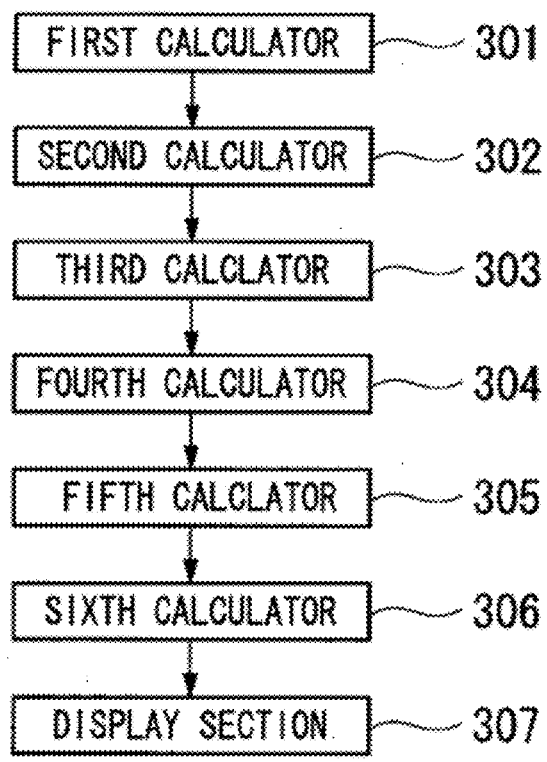
FIG. 15 is a block diagram schematically illustrating a configuration of a forming simulator according to the third embodiment.

FIG. 15 is a block diagram of a schematic structure of the forming simulator according to the third embodiment.

The forming simulator performs forming simulation at the bottom dead point of the tool of a thin metal sheet using the finite element method. The forming simulator includes a first calculator 301, a second calculator 302, a third calculator 303, a fourth calculator 304, a fifth calculator 305, a sixth calculator 306 and a display section 307. The first calculator 301 calculates each element equivalent nodal force vector $\{f\}_e$. The second calculator 302 calculates the total equivalent nodal force vector $\{f\}$. The third calculator 303 calculates the inverse matrix $[K]^{-1}$ of the overall stiffness matrix. The fourth calculator 304 multiplies the total equivalent nodal force vector $\{f\}$ by the inverse matrix $[K]^{-1}$ of the overall stiffness matrix with the total equivalent nodal force vector $\{f\}$ being the external force vector. The fifth calculator 305 multiplies the corrected total equivalent nodal force vector $\{f'\}$ by the inverse matrix $[K]^{-1}$ of the overall stiffness matrix for each or plural elements. The sixth calculator 306 calculates the amount of change in calculation results of the calculator 304 and calculation results of the calculator 305 for each or plural elements. The display section 307 displays calculation results of the calculator 306. The calculators of 301 to 306 are embodied as, for example, functions of a central processing unit (CPU) of a computer.

The first calculator 301 solves, for example, Equation (3) on the basis of the given stress tensor (see Equation (2)) and calculates the element equivalent nodal force vector $\{f\}_e$ for each finite element (e.g., a four-node shell element) or for plural finite elements.

The second calculator 302 integrates the element equivalent nodal force vector $\{f\}_e$ for each finite element calculated by the first calculator 301 (or for plural finite elements) with respect to all the areas (or specified areas) of the thin metal sheet (see Equation (4)) and calculates the total equivalent nodal force vector $\{f\}$ of the areas.

The third calculator 303 calculates the inverse matrix $[K]^{-1}$ of the overall stiffness matrix. The overall stiffness matrix is obtained by using a relationship matrix between displacement and strain corresponding to the foregoing various finite elements, a relationship matrix between stress and strain based on a general linear elasticity constitutive law and a coordinate transform matrix, as described in, for example, Non-patent Document 1. The inverse matrix $[K]^{-1}$ can be obtained by an ordinary calculation method.

The fourth calculator 304 multiplies the inverse matrix $[K]^{-1}$ of the overall stiffness matrix by the total equivalent nodal force vector $\{f\}$ with the total equivalent nodal force vector being the external force vector (see Equations (5) to (7)).

The fifth calculator 305 multiplies the inverse matrix $[K]^{-1}$ of the overall stiffness matrix by the corrected equivalent nodal force vector $\{f'\}$ with the corrected equivalent nodal force vector $\{f'\}$ obtained by subtracting the element equivalent nodal force vector $\{f\}_e$ calculated for each element from the total equivalent nodal force vector $\{f\}$ being the external force (see Equations (8) and (9)).

The sixth calculator 306 calculates the amount of change in displacement with respect to the specific node for evaluation of springback using the first displacement ($u_i^{(1)}$)

obtained from the fourth calculator 304 and the second displacement ($u_i^{(2)}$) obtained from the fifth calculator 305 (See Equation (10)).

The display section 307 displays contribution of each component of the displaced amount at the specific position of the thin metal sheet obtained by the sixth calculator 306. In particular, the contribution of each component is colored with respect to the specific position of the thin metal sheet, for example, so that a user can recognize the springback-inducing area corresponding to the specific position.

(Forming Simulation Method According to the Third Embodiment)

Hereinafter, a forming simulation method using the forming simulator will be described.

Figure 16:
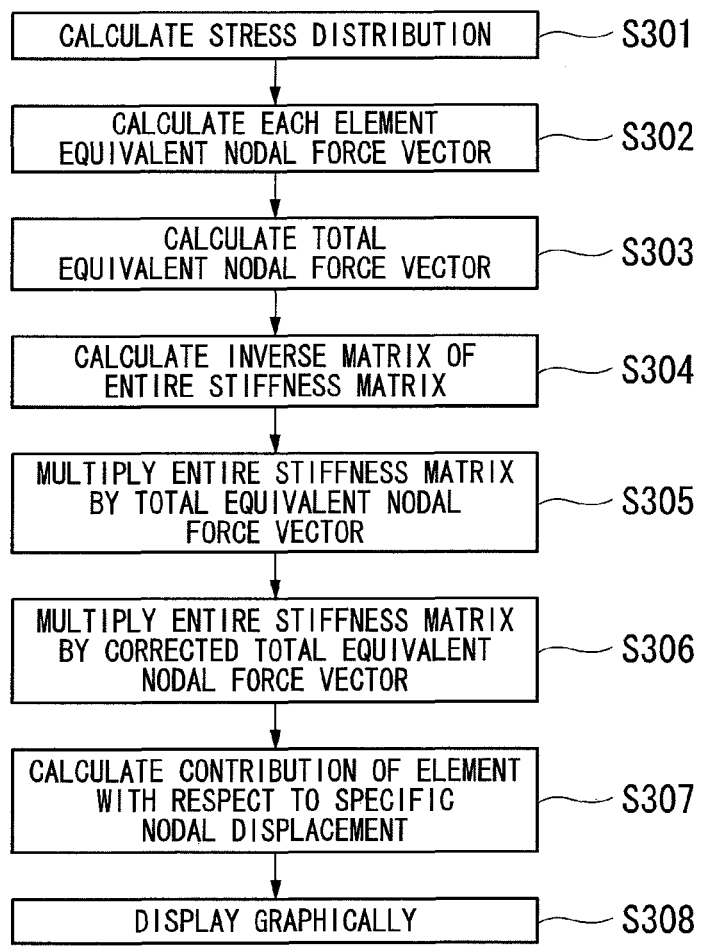
FIG. 16 is a flowchart of a forming simulation method according to the third embodiment illustrated step by step.

FIG. 16 is a flowchart of a forming simulation method according to the third embodiment illustrated step by step.

Figure 17A:
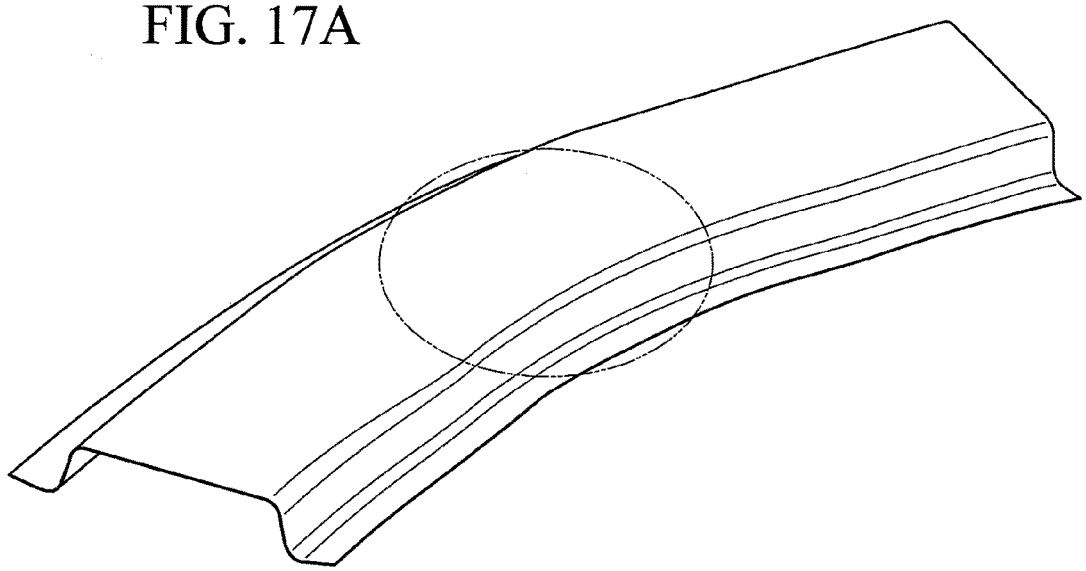
FIG. 17A is a perspective view of a metal product (i.e., a high-tensile steel sheet) used in the third embodiment.
Figure 17B:
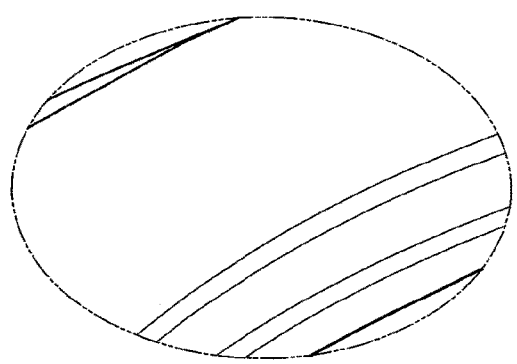
FIG. 17B is a partial enlarged view of FIG. 17A.

A metal product (i.e., a high-tensile steel sheet) illustrated in FIGS. 17A and 17B is employed as a thin metal sheet for forming simulation in the present embodiment. The metal product is illustrated as an overview in FIG. 17A and a partially enlarged view in FIG. 17B.

First, stress distribution (i.e., stress tensor) at the bottom dead point of the tool for the metal product is calculated (step S301).

The stress distribution at the bottom dead point of the tool is calculated using, for example a commercially-available forming simulation program (PAM-STAMP available from Nihon ESI K.K.).

Main analysis conditions in the forming simulation according to the third embodiment are the same as those shown in Table 1 employed in the first embodiment.

Figure 18:
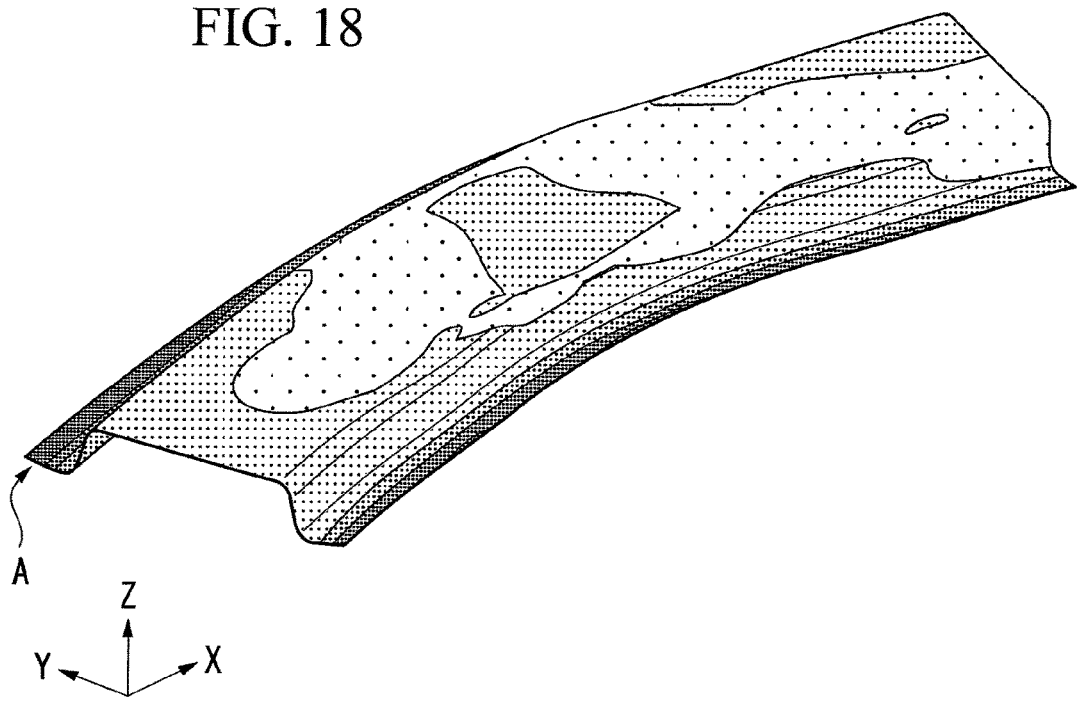
FIG. 18 is a schematic diagram illustrating distribution of the displaced amount of springback obtained by forming simulation after the metal product is released.

Distribution of the displaced amount caused by springback obtained by forming simulation after the product is released is illustrated in FIG. 18. The displaced amount is illustrated by contour lines in accordance with displayed density. The highest density indicates the largest displaced amount. As illustrated in FIG. 18, the displaced amount in a direction of the Z-axis at a point A is especially large, which indicates that the metal product is warped and distorted at the point A.

Subsequently, the first calculator 301 makes a calculation of, for example, Equation (3) on the basis of the stress tensor obtained by step S301 and the element equivalent nodal force vector $\{f\}_e$ is calculated for each finite element (e.g., the four-node shell element) or for plural finite elements (step S302).

The second calculator 302 then integrates the element equivalent nodal force vector $\{f\}_e$ for each finite element (or for plural finite elements) calculated by the first calculator 301 with respect to all the areas (or specific areas) of the thin metal sheet and calculates the total equivalent nodal force vector $\{f\}$ (step S303).

Then, the third calculator 303 calculates the inverse matrix $[k]^{-1}$ of the overall stiffness matrix (step S304).

The fourth calculator 304 then multiplies the inverse matrix $[k]^{-1}$ of the overall stiffness matrix by the total equivalent nodal force vector $\{f\}$ with the total equivalent nodal force vector $\{f\}$ being the external force vector (step S305).

The fifth calculator 305 multiplies the inverse matrix $[K]^{-1}$ of the overall stiffness matrix by the corrected equivalent nodal force vector $\{f'\}$ with the corrected equivalent nodal force vector $\{f'\}$ obtained by subtracting the element equivalent nodal force vector $\{f\}_e$ calculated for each element from the total equivalent nodal force vector $\{f\}$ being the second external force (step S306).

The sixth calculator 306 then calculates the amount of change in displacement with respect to the specific node for evaluation of springback, i.e., the contribution of each element, using the first displacement ($u_i^{(1)}$) obtained from the fourth calculator 304 and the second displacement ($u_i^{(2)}$) obtained from the fifth calculator 305 (step S307).

The contribution of each component of the displaced amount caused by springback with respect to a predetermined (i.e., specified) position of the thin metal sheet is graphically displayed by the display section 307 (step S307).

Figure 19:
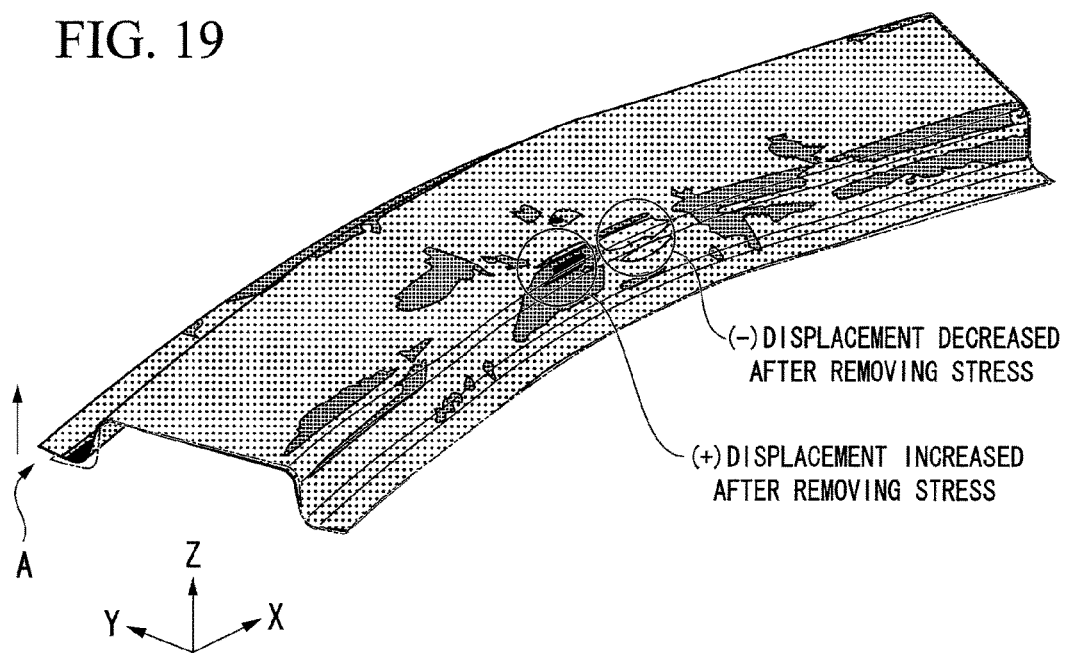
FIG. 19 is a schematic diagram of an exemplary graphic display in a display section according to the third embodiment.

Exemplary contribution of each component of the displaced amount caused by springback with respect to the specific position of the thin metal sheet displayed by the display section 307 is illustrated in FIG. 19. A dashed dotted line in FIG. 19 indicates an outline of a configuration of the thin metal sheet at the bottom dead point of the tool. The distribution of the contribution of the component with respect to the displacement in the z direction at the point A in FIG. 18 is illustrated with a contour line in FIG. 19. The contribution is made dimensionless by dividing by the displacement in the direction of z at the point A. The highest display density indicates the largest contribution.

As a comparative example of the third embodiment, a metal product identical to that of the third embodiment was subject to forming simulation using the technique disclosed in Patent Document 1.

Here, the metal product is divided into plural areas on the basis of the stress distribution obtained in step S301. High-stress areas are sequentially released (i.e., the stress is reduced to zero). Then the divided areas are subject to springback analysis (i.e., tool restraint is released and the deformation amount caused by elastic recovery is calculated) to specify areas with a larger deformation amount.

Figure 20:
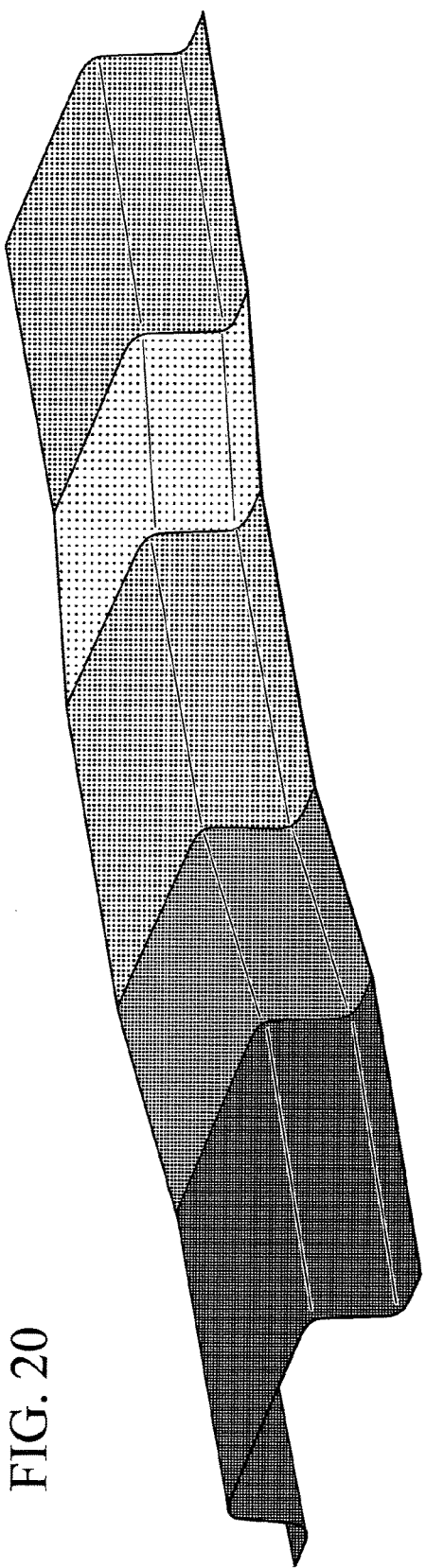
FIG. 20 is a schematic diagram of deformation results of a metal product according to a comparative example of the third embodiment.

The result of the comparative example (i.e., contribution of each area) is illustrated in FIG. 20. The contribution is illustrated by contour lines in accordance with displayed density. The highest display density indicates the largest contribution. As illustrated in FIG. 20, plural areas with great contribution are widely distributed. It is thus difficult to specify springback-inducing areas accurately. Since the display result depends on how the areas are divided, it is difficult to display the deformation amount accurately.

In the third embodiment, as illustrated in FIG. 19, as compared with that illustrated in FIG. 20, magnitude of the influence of the displacement at the point A in FIG. 18 can be recognized pinpointedly and quantitatively. If the areas having significant influence can be specified pinpointedly, the product configuration in the areas can be modified slightly. It is therefore possible to efficiently reduce springback and to improve dimensional accuracy of the press-formed product.

As described above, according to the third embodiment, springback-occurring areas during forming of the thin metal sheet can be specified by a simple calculation instead of complicated and time-consuming calculation, such as a matrix operation of large-scale simultaneous equations. As a result, accurate forming can be provided.

Comparison of calculation time according to the foregoing embodiments is shown in Table 2. The calculation time herein is represented by a relative value with the value in the comparative example being 100.

TABLE 2

|  | Total calculation time | Calculation time for each divided area |
| --- | --- | --- |
| Example 1 | 0.2 | — |
| Example 2 | 0.6 | — |
| Example 3 (31,712 areas) | 571 | 0.1 |
| Comparative Example (5 areas) | 100 | 100 |

Figure 21:
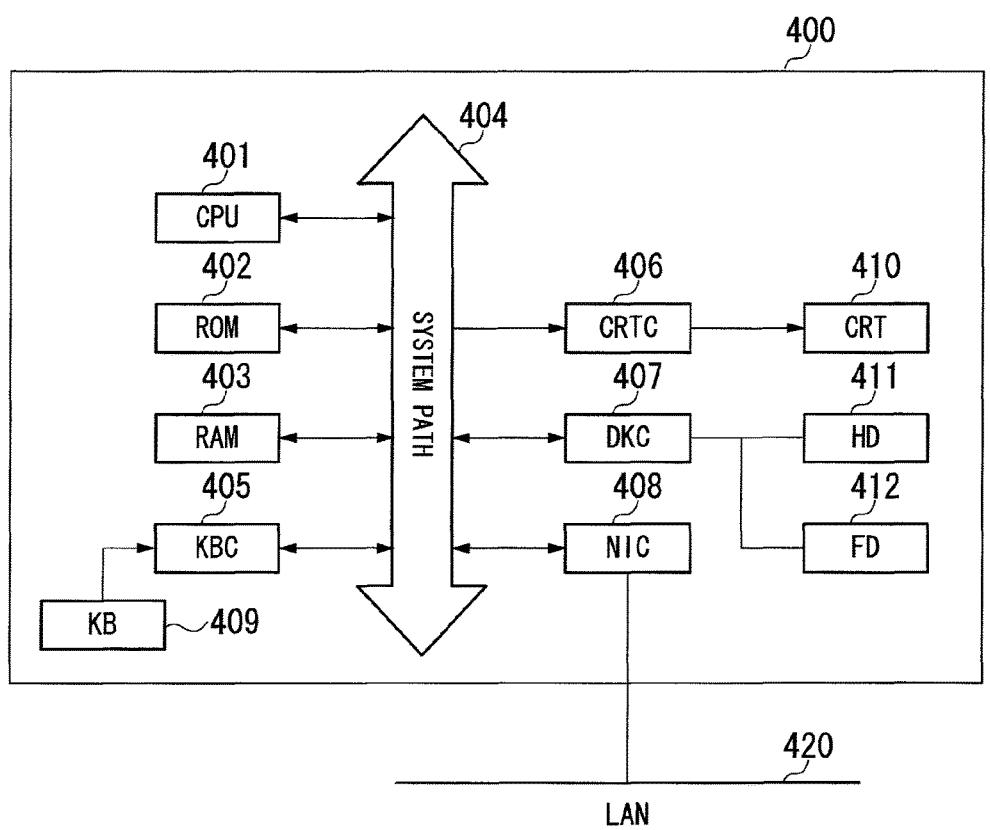
FIG. 21 is a schematic diagram illustrating an internal configuration of a personal user terminal according to a fourth embodiment.

Referring now to FIG. 21, a fourth embodiment of the present invention will be described in detail.

The functions, such as the components (except for the display sections 104, 205 and 307) constituting the forming simulator according to the first to the third embodiments, can be embodied when a program stored in, for example, the RAM and the ROM of a computer, is operated. Similarly, each step (e.g., steps S101 to S105 of FIG. 4, steps S201 to S206 of FIG. 10 and steps S301 to S308 of FIG. 16) of the forming simulation method can be embodied when a program stored in, for example, the RAM and the ROM of a computer, is operated. The program and a computer-readable storage medium having the program stored thereon are within the scope of the present invention.

In particular, the program is recorded on, for example, a recording medium, such as a CD-ROM, or is provided to a computer via various transmission media. Examples of the recording medium which stores the program thereon include, other than a CD-ROM, a flexible disk, a hard disk, a magnetic tape, a magneto-optical disc, a nonvolatile memory card. Examples of the transmission medium of the program include a communication medium in a computer network system that transmits and provides program information as a carrier wave. Examples of the computer network herein include LAN, WAN, such as the Internet, and a wireless communication network. Examples of the communication medium include wired circuits, such as optical fiber, and wireless circuits.

Examples of the programs included in the present invention are not limited to those that embody the functions of the foregoing embodiments when executed by a computer. For example, programs that embody the functions of the foregoing embodiments in cooperation with, for example, an operating system (OS) or other application software run on the computer are included in the present invention. In addition, supplied programs of which some or all processes are executed by an expansion board or an expansion unit of a computer to embody the functions of the foregoing embodiments are also included in the present invention.

FIG. 21 is a schematic diagram of an exemplary internal configuration of a personal user terminal. In FIG. 21, the reference numeral 400 denotes a personal computer (PC) which includes a CPU 401. The PC 400 executes device control software stored in a ROM 402 or hard disk (HD) 411, or supplied from a flexible disk drive (FD) 412. The PC 400 collectively controls each device connected to a system bus 404.

Procedures of steps S101 to S105 of the first embodiment illustrated in FIG. 4, procedures of steps S201 to S206 of the second embodiment illustrated in FIG. 10 and procedures of steps S301 to S308 of the third embodiment illustrated in FIG. 16 are executed by CPU 401 and a program stored in the ROM 402 or the hard disk (HD) 411 of the PC 400.

The reference numeral 403 denotes a RAM which functions as, for example, a main memory and a work area of the CPU 401. The reference numeral 405 denotes a keyboard controller (KBC) which controls instruction input from, for example, a keyboard (KB) 409 and devices which are not illustrated.

The reference numeral 406 denotes a CRT controller (CRTC) which controls display of a CRT display (CRT) 410. The reference numeral 407 denotes a disk controller (DKC). The DKC 407 controls access with the flexible disk (FD) 412 and the hard disk (HD) 411 which stores, for example, a boot program, plural applications, a compilation file, a user file and a network management program. The boot program herein is a start program, i.e., a program which starts execution (operation) of hardware or software of a personal computer.

The reference numeral 408 is a network interface card (NIC) used for bidirectional data exchange among a networked printer, another network equipment or another PC via a LAN 420.

According to the above-described personal user terminal, springback-occurring areas during forming of the metal sheet can be specified by a simple calculation instead of complicated and time-consuming calculation, such as a matrix operation of large-scale simultaneous equations. As a result, accurate forming can be provided.

Referring now to FIGS. 22 to 30, a fifth embodiment of the present invention will be described in detail.

Figure 22:
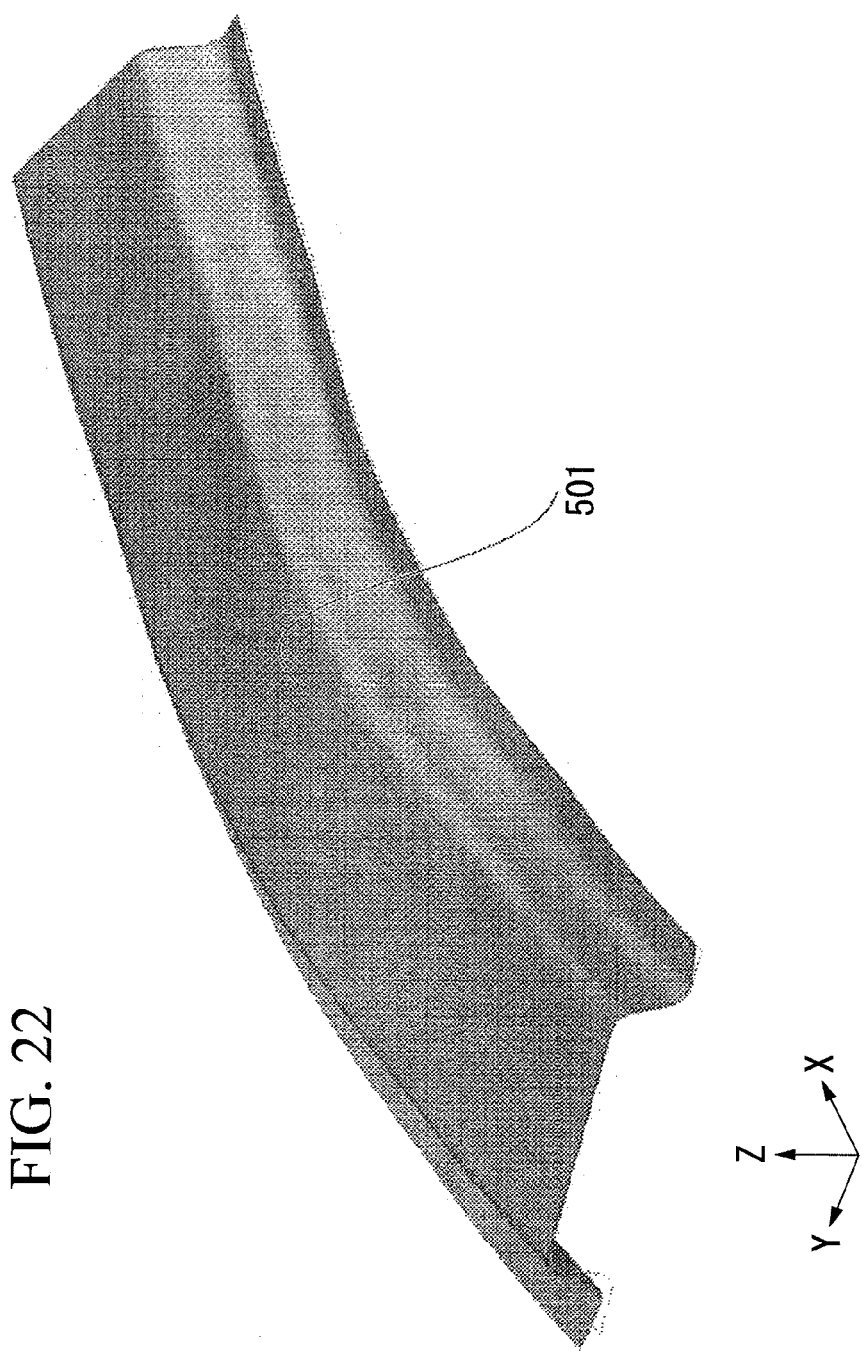
FIG. 22 is a schematic perspective view of an exemplary press-formed product of a thin metal sheet of interest which is subject to press-forming.

FIG. 22 is a schematic perspective view of an exemplary configuration of a press-formed product (hereinafter, referred to as "the present product") of a thin metal sheet to be subject to springback control during press forming according to an embodiment of the present invention. The present product 501 is produced by cold press-forming, using upper and lower tools, a raw material, such as an elastic-plastic material such as a thin metal sheet and an aluminum thin sheet, and a composite material. After the raw material is released from the tools, the product configuration changes due to elastic recovery (i.e., springback) from a configuration at the bottom dead point of the tool (i.e., a forming target configuration). It is therefore impossible to obtain predetermined dimensional accuracy of the product, which may cause defects including poor welding and decreased assembly precision.

Figure 23:
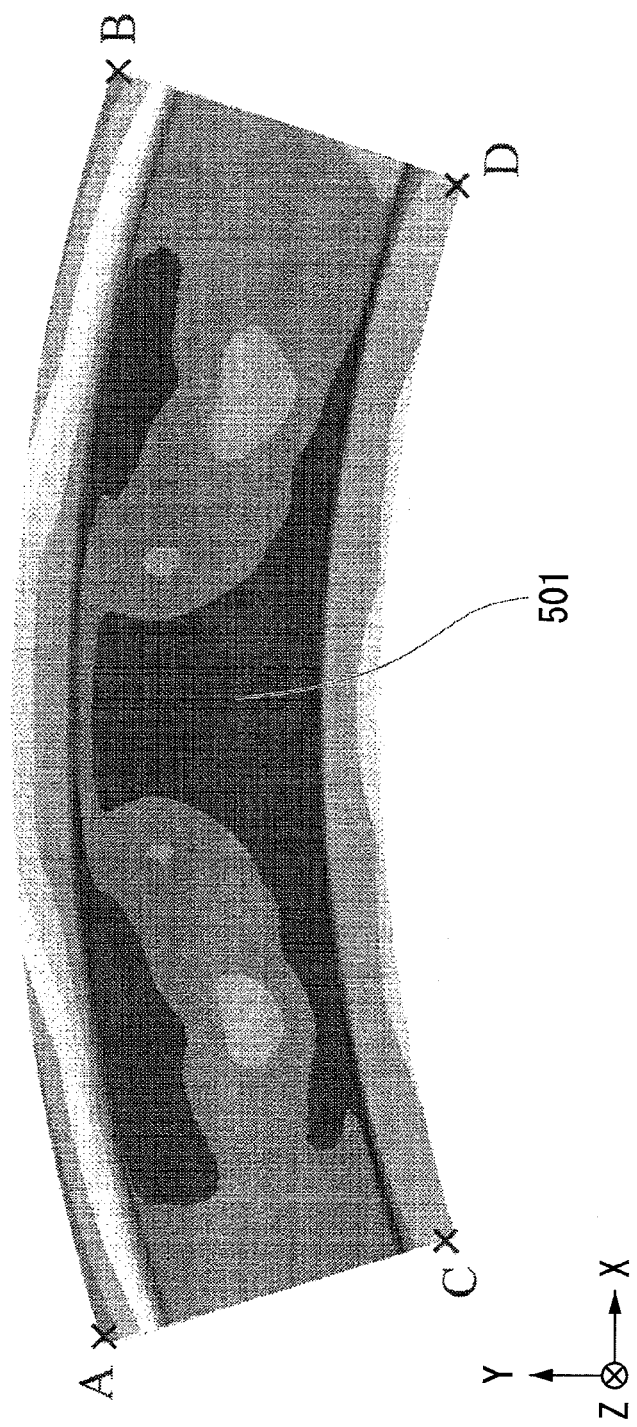
FIG. 23 is a schematic diagram illustrating distribution of a displaced amount of springback obtained by forming simulation after the metal product is released.

FIG. 23 illustrates an exemplary springback of the present product 501 in a contour diagram of the displaced amount caused by springback. Density of the color indicates the displaced amount along the Z-axis direction (i.e., a direction perpendicular to the sheet of paper) compared to the value at the bottom dead point of the tool. A plane formed by lines connecting points A, B, C and D of the present product 501 illustrated in FIG. 23 must be in parallel with an X-Y plane (i.e., in a horizontal direction of the sheet of paper). Outer end points (points A and B) of a curved configuration are lifted in the Z-axis direction, which indicates that the cross section is distorted.

It is an object of the present invention to rationally control the springback.

Usual approaches to control springback may include to increase the elastic stiffness of the product itself (a first method) and to reduce inner residual stress which induces springback (a second method). The first method may usually include changing the product configuration and providing shape fixing beads. The second method may usually include providing beads, multistage forming, warm forming and hot forming.

If dimensional accuracy is insufficient even after these methods are taken, the tool configuration is corrected to a configuration different to that of the product expecting the springback amount (a third method). However, accuracy of the expected amount is subject to various factors and tool correction cost also increases.

Figure 24:
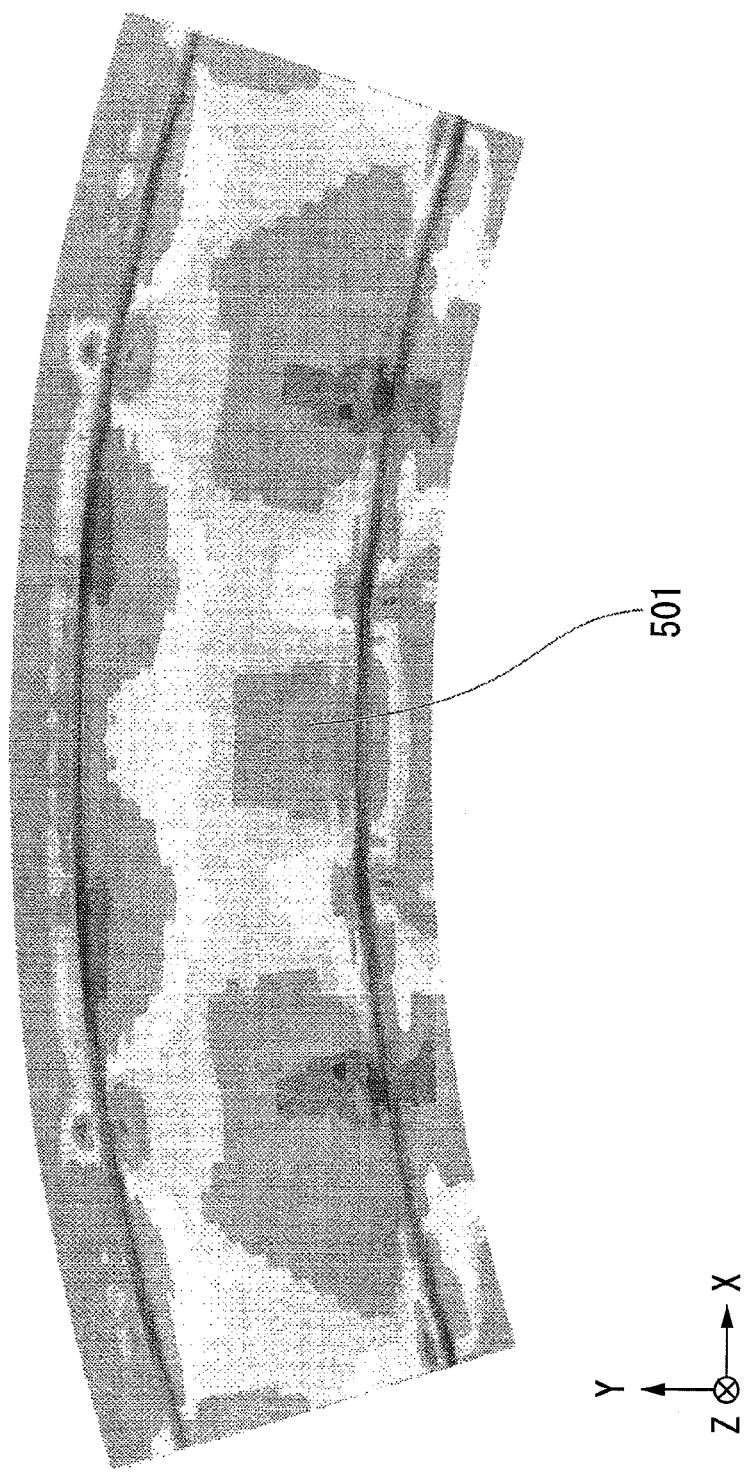
FIG. 24 is a schematic diagram illustrating stress distribution at the bottom dead point of the tool in a metal product obtained by forming simulation.

In a product with a complicated configuration, distribution of the inner residual stress at the bottom dead point of the tool is uneven and complicated. FIG. 24 illustrates an example of expected inner residual stress at the bottom dead point of the tool in the present product 501 calculated by the press-forming simulation on the basis of the finite element method. The principal stress distribution at the center of the thickness of the sheet is represented by color density in FIG. 24. There are plural areas with great inner residual stress illustrated with dense color. There are also areas with tensile stress and compression stress.

The press-forming simulation may be performed by any of the simulation processes according to the first to the fourth embodiments.

The springback control method of the present invention includes a first step of specifying springback-inducing areas of the present product 1, a second step of previously forming one or more embossed portions at the springback-inducing areas and a third step of crushing the embossed portions flat so as to provide a predetermined product configuration.

In the first step of the present invention, for the present product 1 having the complicated configuration exhibiting complicated inner residual stress distribution, areas where springback changes due to partial change of the internal stress of the present product 1 are extracted and specified as the springback-inducing areas (i.e., portions).

In the extracting method, the inner residual stress of the present product 1 expected by calculation through press-forming simulation on the basis of the finite element method is made to change for each product point and re-calculated for expectation. Areas where the springback amount changes significantly before and after the change of the inner residual stress are specified as springback-inducing areas. The inner residual stress may be changed such that the stress component at the product area is set uniformly to zero (i.e., released) (the stress at the bottom dead point of the tool is set to 0) at the plate thickness direction total integration points (i.e., stress evaluation points). Alternatively, the inner residual stress may be divided into a membrane stress component (the stress of the plate thickness center integration point) and a bending stress component (obtained by subtracting the membrane stress from the stress of the whole plate thickness direction integration point). These components are set to zero so that evaluation can be made with the influence of the in-plane stress and the bending stress can be separated from each other. The size of the product area may be area division in accordance with the feature of the configurations, such as the flange portion, the bending R portion and a web portion. However, finite element mesh division areas sufficiently fine for representing the configuration are preferably used as the product areas to allow extraction with high resolution.

Figure 25:
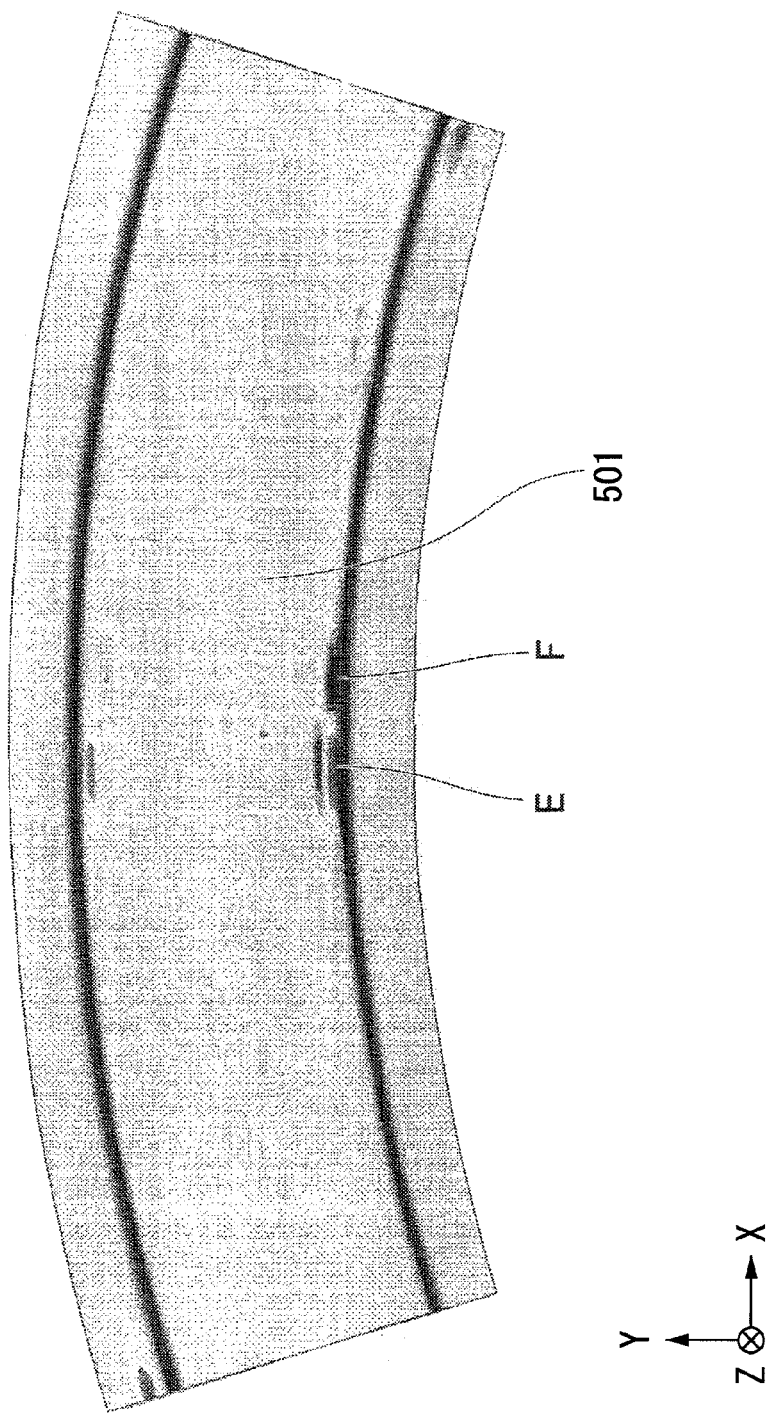
FIG. 25 is a schematic diagram illustrating distribution of a degree of influence on distortion of a metal product obtained by forming simulation according to a fifth embodiment.

FIG. 25 is a contour diagram in which the inner residual stress is released for each product area corresponding to the finite element in the press forming simulation on the basis of the finite element method illustrated in FIG. 24 and distribution of values obtained by normalizing the difference in the springback amount before and after the release with the springback amount before the release is illustrated by color density. As illustrated with dense color in FIG. 25, areas E and F at a part of the present products 501 where the change is large (i.e., areas where springback is reduced when released) can be specified as the springback-inducing areas E and F. It was found that the springback-inducing areas E and F illustrated in FIG. 25 are different from areas with greater inner residual stress illustrated in FIG. 24, and that areas with greater stress do not always induce springback.

Another extracting method is to specify areas in which springback is changed when the internal stress of the present product 501 is partially changed as the springback-inducing areas. That is, after an actual press-formed product is partially cut out or punched so that stress is partially released, areas in which the springback amount changes significantly before and after the stress release can be specified as springback-inducing areas.

Figure 26:
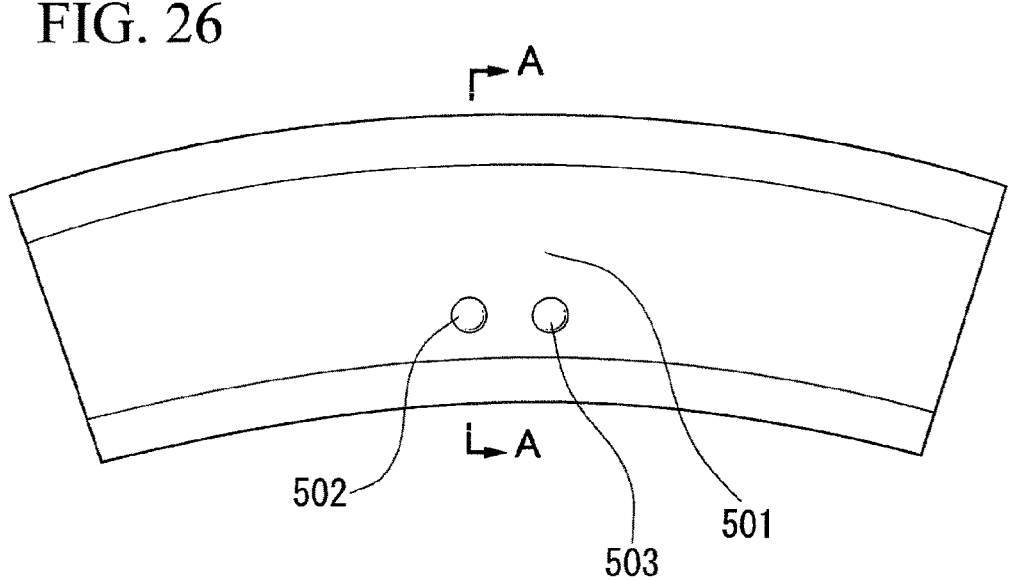
FIG. 26 is a plan view of a formed product in a first press-forming step according to the fifth embodiment.

Next, in the second step of the present invention, the embossed portions are formed in the springback-inducing areas specified by the method in the first step of the press-forming process. FIG. 26 is a plan view of the present product 501 formed in the first step of the press-forming process. Here, two circular embossed portions 502 and 503 identical in size are formed in the springback-inducing areas E and F illustrated in FIG. 25.

Figure 27:
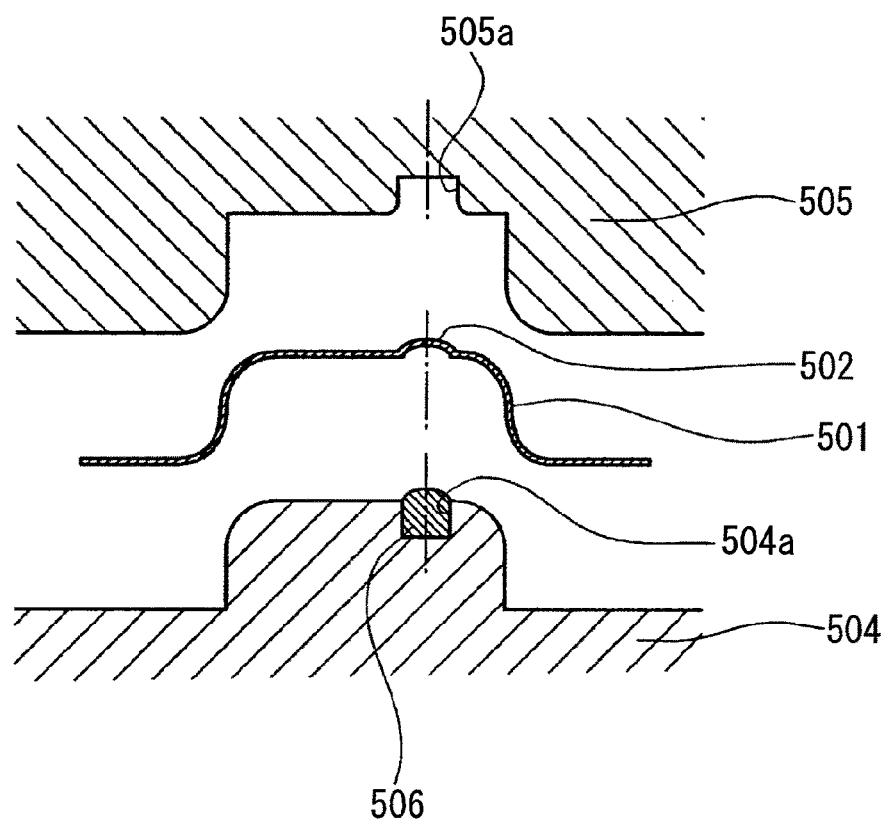
FIG. 27 is a cross-sectional view of the formed product in the first press-forming step and a tool taken along line A-A in FIG. 26 according to the fifth embodiment.

FIG. 27 illustrates an arrangement of the press-formed present product 501 and the tools (lower tool 504, upper tool 505) in a cross section taken along line A-A in FIG. 26. In FIG. 27, the embossing section is configured such that a cylindrical inner-tool 506 is inserted in the lower tool 504. The inner-tool 506 may be plural removable cylindrical inner tools 506 having different height dimensions which are configured to fit into the recess 504a of the lower tool 504. The cylindrical inner-tools 506 are replaced to easily adjust the height of the embossed portions 502 and 503. The configuration of the embossed portions (i.e., the plane shape of the inner-tool 506) is not limited to a circular shape, and may be any configuration, such as elliptical and rectangular. However, a cylindrical-shaped inner tool is easily produced and several inner-tools 506 having different heights can be prepared for height dimension control of the embossed portions 502 and 503 at lower cost.

Figure 28:
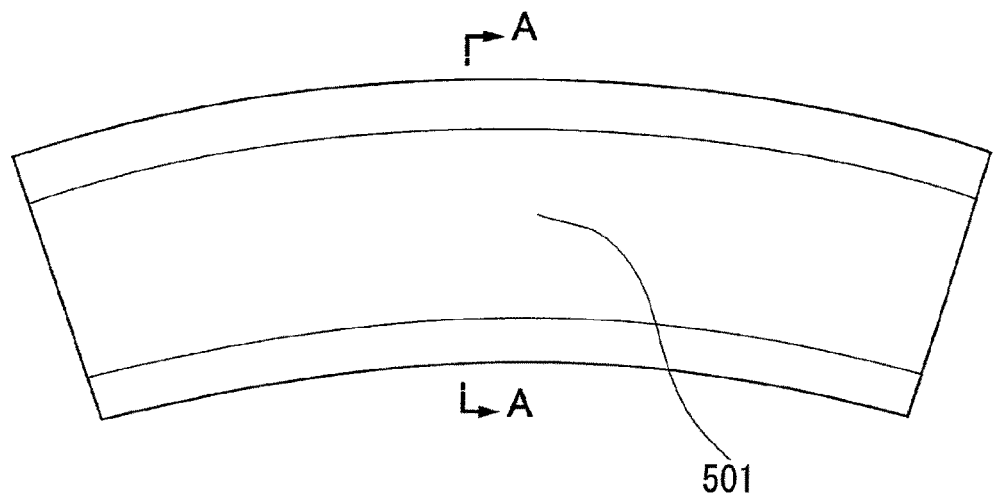
FIG. 28 is a plan view of a formed product in a second press-forming step according to the fifth embodiment.
Figure 29:
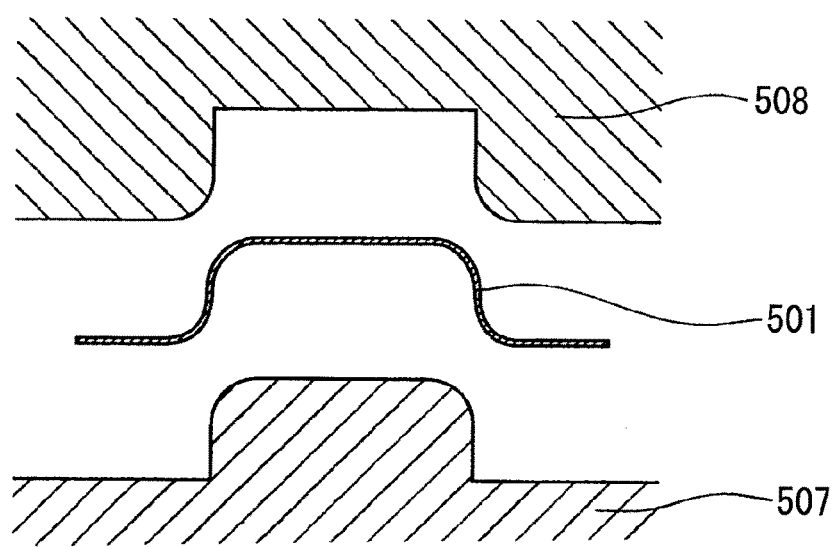
FIG. 29 is a cross-sectional view of the formed product in the second press forming step and a tool taken along line A-A in FIG. 28 according to the fifth embodiment.

Next, in the third step of the present invention, i.e., the second step of the press-forming process, the press-formed product with the embossed portions press-formed in the first step of the press-forming process is flattened by an embossless flat tool so as to provide a predetermined product configuration. FIG. 28 is a plan view of the present product 501 formed in the second step of the press-forming process. FIG. 29 illustrates an arrangement of the press-formed present product 501 and the tools (lower tool 507, upper tool 508) in a cross section taken along line A-A in FIG. 27 in the second step of the press-forming process. By crushing flat the once press-embossed portions, the effect of repeated bending and returning can reduce the inner residual stress which induces the springback and thus the springback amount decreases significantly.

In the adjustment stage of the tool, the height of the embossed portions is adjusted by using cylindrical inner tools of various heights in the first step of the press-forming process. Subsequently, the embossed portions are flattened in the second step of the press-forming process. Accordingly, springback can be controlled and suppressed easily without changing the product configuration. It is also possible to eliminate unnecessary embossed portions by forming the end portion of the cylindrical inner tool 6 illustrated in FIG. 27 not to be a curved emboss configuration but to be a flat surface. Further, a cylindrical inner tool having a flat end portion may be inserted in the recess 504a for the embossed projection of the lower tool 504 illustrated in FIG. 27, and the embossed recess 505a of the upper tool 505 may be made flat by using a removable inner tool. In this manner, it is possible to perform the second step of the press-forming process using the same tool as that of the first step of the press-forming process without using another tool.

Although the tools illustrated in FIGS. 27 and 28 are identical in shape except for the embossed portions in the first and second steps of the press-forming process, the present invention is not limited to the same. Configurations with varied corner curvature radii or mounting seat surfaces for other parts may be formed for each step.

FIG. 22 is a perspective view of the press-formed product (the present product 501) to which the present invention was applied.

The material of the present product 501 is a cold-rolled high-tensile steel sheet having a sheet thickness of 1.2 mm and tensile strength of about 980 MPa. Before fabricating a tool for press-forming, springback-inducing areas were extracted on the basis of stress distribution at the bottom dead point of the tool by using a forming simulation program (PAM-STAMP available from Nihon ESI K.K.).

Main analysis conditions in the forming simulation according to the fifth embodiment are the same as those shown in Table 1 employed in the first embodiment.

Here, distribution of the displaced amount caused by springback of the present product 1 after tool release obtained by the forming simulation is illustrated in FIG. 23. The displaced amount is illustrated by contour lines in accordance with displayed density. The highest density indicates the largest displaced amount. As illustrated in FIG. 23, the displaced amount in a direction of the Z-axis at the points A and B (i.e., the direction perpendicular to the sheet of paper) is especially large, which indicates that the present product 501 is warped and distorted. FIG. 24 is a major principal stress distribution contour diagram at the bottom dead point of the tool.

Then, in order to specify the areas which induce springback, the displaced amount caused by springback after tool release was calculated with the stress of the bottom dead point of the tool compulsorily being zero for each area. Difference of the direction displacement DA and DC in the direction of the Z-axis at the points A and C, i.e., DA-DC (=$D_{A-C}$), is used as an index representing the springback amount with respect to distortion. The degree of influence to springback amount of the areas was represented by Equation (16) on the basis of the springback amount before and after the stress is released.

$$\text{Degree of influence} = D_{A-C}(\text{after stress is released})/ D_{A-C}(\text{before stress is released}) - 1 \quad (16)$$

The product areas are made to correspond to a finite element unit and Equation (16) was solved for each component. The resulting degree of influence is illustrated in the distribution contour diagram in FIG. 25. Distribution of the degree of influence is illustrated by color density so that a viewer can specify areas E and F at a part of the present product 501 where the change is large, i.e., the springback-inducing areas E and F. It was found that the springback-inducing areas E and F are different from areas with greater inner residual stress illustrated in FIG. 24, and that areas with greater stress do not necessarily induce springback.

Next, on the basis of the result of specification of the springback-inducing areas E and F by the forming simulation, a prototype of a tool for press forming was made and used for forming experiments.

The embossed portions 502 and 503 were press-formed at two points (i.e., points E and F) of the areas E and F on the web surface where the degree of influence is large, in the first step of the press-forming process. FIG. 26 is a plan view of the press-formed product of the first step of the press-forming process.

Figure 30:
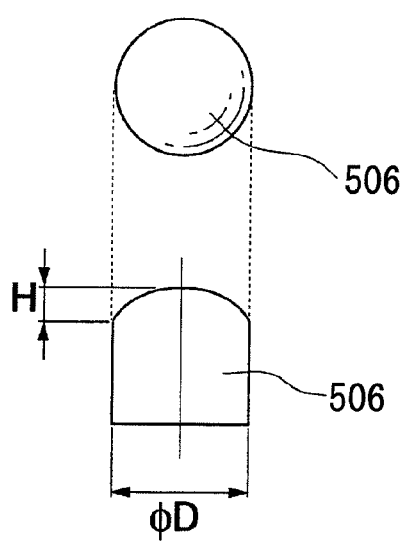
FIG. 30 is a schematic diagram of a cylindrical embossing inner tool according to the fifth embodiment.

The embossed portions 502 and 503 each have a spherical shell configuration having a diameter of φD=10 mm. For a forming tool, as shown in FIG. 27, a configuration in which four types of cylindrical inner tools 506 having heights of H=0, 1, 2 and 3 mm as illustrated in FIG. 30 may be respectively inserted into the lower tool 504, is employed.

Samples of the first step of the press-forming process were prepared, so that the samples have various height of respective embossed portions press-formed at points E and F. Then, a product sample (the present product 1) as illustrated in FIG. 28 was obtained by a second step of the press-forming process which crushes the embossed portions 502 and 503 with a smooth tool (the lower tool 507, upper tool 508) as illustrated in FIG. 29.

The measurement results of the springback amount $D_{A-C}$ with respect to each product sample are shown in Table 3.

TABLE 3

| | Height of embossed portion [mm] | | | |
| --- | --- | --- | --- | --- |
| No. | Point E | Point F | $D_{A-C}$ [mm] | Remarks |
| 1 | 0 | 0 | 7.5 | Comparative |
| 2 | 1 | 1 | 2.5 | Inventive Example |
| 3 | 2 | 2 | 0.5 | Inventive Example |
| 4 | 3 | 3 | −0.5 | Inventive Example |
| 5 | 1 | 2 | 1.5 | Inventive Example |
| 6 | 0 | 2 | −0.5 | Inventive Example |

It was confirmed that, with respect to the Comparative Example with the height of the embossed portion being zero, when the embossed portions become taller, the springback amount ($D_{A-C}$) decreases, and that when the height is adjusted variously, the springback amount including the spring go ($D_{A-C}$) is negative (spring in)) can be varied and controlled. It should be noted that the forming simulation method of the present invention is preferably used to specify the areas where springback occurs.

As described above, according to the fifth embodiment, even if a press-formed product has a complicated shape, a press-forming tool product excellent in accuracy of dimension can be obtained efficiently using an easily adjustable tool by specifying areas where springback occurs during press-forming without changing the product configuration. In the foregoing description, the present embodiment has been described with reference to the method of controlling springback of the thin metal sheet. Applications of the present invention, however, are not limited to press-forming simulation of thin metal sheets. The present invention can also be applied to, for example, forming simulation of elastic-plastic materials, such as plastic materials and composite materials. The present invention can also be applied to forming simulation of linear materials and materials of certain thickness as well as thin plate materials.

INDUSTRIAL APPLICABILITY

According to the present invention, springback-inducing areas during forming of a metal sheet can be specified by a simple calculation instead of complicated and time-consuming calculation, such as a matrix operation of large-scale simultaneous equations, in order to provide accurate forming. It is therefore possible to provide time-saving, high-accuracy forming simulation.

DESCRIPTION OF REFERENCE NUMERALS

101: first calculator
102: second calculator
103: specifying section
104: display section
201: first calculator
202: second calculator
203: third calculator
204: fourth calculator
205: display section
301: first calculator
302: second calculator
303: third calculator
304: fourth calculator
305: fifth calculator
306: sixth calculator
307: display section
501: press-formed product
502: embossed portion (point E)
503: embossed portion (point F)
504: lower tool in first step of the press-forming process
505: upper tool in first step of the press-forming process
506: embossing inner tool
507: lower tool in second step of the press-forming process
508: upper tool in second step of the press-forming process

The invention claimed is:

1. A forming method of an elastic-plastic material based on a forming simulation of the elastic-plastic material using one or a plurality of upper or lower tools having one tool configuration which is not modified during the forming simulation, the forming method comprising:

calculating an element equivalent nodal force vector $\{f\}_e$, from a stress tensor $\sigma$ obtained using a computer to perform a finite element method, for a plurality of finite elements of a first target configuration of the elastic-plastic material based on Equation (3), $$\{f\}_e = \int_{Ve} [L]^t [B]^t \{\sigma\} dV = \begin{Bmatrix} \vdots \\ N_x^i \\ N_y^i \\ N_z^i \\ M_x^i \\ M_y^i \\ M_z^i \\ \vdots \end{Bmatrix} \quad (3)$$

where [L] represents a coordinate transform matrix and [B] represents a relationship matrix between displacement and strain, the coordinate transform matrix [L] is a transformation matrix for converting the element equivalent nodal force vector in an element coordinate system into a vector in a global coordinate system, the coordinate transform matrix [L] is calculated by using a direction cosine with respect to an element coordinate system (X', Y' and Z') of the X-, Y- and Z-axes of the global coordinate system;

calculating a total equivalent nodal force vector $\{f\}$ of areas by integrating the element equivalent nodal force vector $\{f\}_e$ for the plurality of finite elements for at least a portion of the elastic-plastic material as represented in Equation (4), $$\{f\} = \int_V \{f\}_e dV \quad (4)$$

wherein the calculated total equivalent nodal force vector is obtained by converting stress at bottom dead point of the tool into an equivalent nodal force, the total equivalent nodal force vector consists of a cross-sectional force component (Nx, Ny and Nz) and a bending moment component (Mx, My and Mz) in the global coordinate system;

calculating an amount of only the bending moment component of the total equivalent nodal force vector;

displaying the amount of the bending moment of the total equivalent nodal force vector, which does not include the cross-sectional force component, as an image corresponding to a configuration of the elastic-plastic material;

setting a bending moment threshold, and specifying, among the at least a portion of the elastic-plastic material, a part having the bending moment component of the total equivalent nodal force vector that is larger than the bending moment threshold, as a springback-inducing area, referring to the calculated total equivalent nodal force vector; and forming a subject elastic-plastic material into a modified target configuration that is modified from the first target configuration at the specified springback-inducing area.

2. The forming method of an elastic-plastic material according to claim 1, wherein the modified target configuration includes embossed portions only at the specified springback-inducing area, the method further comprising forming the embossed portions so as to impart compressive stress.

3. The forming method of the elastic-plastic material according to claim 2, wherein the embossed portions formed in the forming the embossed portions are two or more circular embossed portions having identical dimensions.

4. The forming method of the elastic-plastic material according to claim 2, wherein the forming the embossed portions further comprises adjusting height dimension of configurations of the embossed portions using a plurality of removable tools having different height dimensions which are configured to be fit into recesses provided in the upper or lower tool.

5. A program on a non-transitory computer readable medium which causes a computer to execute forming simulation of an elastic-plastic material using one or a plurality of upper or lower tools having one tool configuration which is not modified during the forming simulation, the forming simulation comprising:

calculating an element equivalent nodal force vector $\{f\}_e$, from a stress tensor $\sigma$ obtained using a computer to perform a finite element method, for a plurality of finite elements of a first target configuration of the elastic-plastic material based on Equation (3), $$\{f\}_e = \int_{Ve} [L]^t [B]^t \{\sigma\} dV = \begin{Bmatrix} \vdots \\ N_x^i \\ N_y^i \\ N_z^i \\ M_x^i \\ M_y^i \\ M_z^i \\ \vdots \end{Bmatrix} \quad (3)$$

where [L] represents a coordinate transform matrix and [B] represents a relationship matrix between displacement and strain, the coordinate transform matrix [L] is a transformation matrix for converting the element equivalent nodal force vector in an element coordinate system into a vector in a global coordinate system, the coordinate transform matrix [L] is calculated by using a direction cosine with respect to an element coordinate system (X', Y' and Z') of the X-, Y- and Z-axes of the global coordinate system;

calculating a total equivalent nodal force vector {f} of areas by integrating the element equivalent nodal force vector $\{f\}_e$ for the plurality of finite elements for at least a portion of the elastic-plastic material as represented in Equation (4), $$\{f\} = \int_V \{f\}_e dV \quad (4)$$

wherein the calculated total equivalent nodal force vector is obtained by converting stress at bottom dead point of the tool into an equivalent nodal force, the total equivalent nodal force vector consists of a cross-sectional force component (Nx, Ny and Nz) and a bending moment component (Mx, My and Mz) in the global coordinate system;

calculating an amount of only the bending moment component of the total equivalent nodal force vector;

displaying the amount of the bending moment of the total equivalent nodal force vector, which does not include the cross-sectional force component, as an image corresponding to a configuration of the elastic-plastic material; and setting a bending moment threshold, and specifying, among the at least a portion of the elastic-plastic material, a part having the bending moment component of the total equivalent nodal force vector that is larger than the bending moment threshold, as a springback-inducing area, referring to the calculated total equivalent nodal force vector, wherein a subject elastic-plastic material is formed into a modified target configuration that is modified from the first target configuration at the specified springback-inducing area.

6. A non-transitory computer-readable recording medium having a program stored therein, the program causing a computer to execute forming simulation of an elastic-plastic material using one or a plurality of upper or lower tools having one tool configuration which is not modified during the forming simulation, the forming simulation comprising:

setting a bending moment threshold;

calculating an element equivalent nodal force vector $\{f\}_e$, from a stress tensor σ obtained using a computer to perform a finite element method, for a plurality of finite elements of a first target configuration of the elastic-plastic material based on Equation (3), $$\{f\}_e = \int_{V_e} [L]^t [B]^t \{\sigma\} dV = \begin{Bmatrix} \vdots \\ N_x^i \\ N_y^i \\ N_z^i \\ M_x^i \\ M_y^i \\ M_z^i \\ \vdots \end{Bmatrix} \quad (3)$$

wherein [L] represents a coordinate transform matrix and [B] represents a relationship matrix between displacement and strain, the coordinate transform matrix [L] is a transformation matrix for converting the element equivalent nodal force vector in an element coordinate system into a vector in a global coordinate system, the coordinate transform matrix [L] is calculated by using a direction cosine with respect to an element coordinate system (X', Y' and Z') of the X-, Y- and Z-axes of the global coordinate system;

calculating a total equivalent nodal force vector {f} of areas by integrating the element equivalent nodal force vector $\{f\}_e$, for the plurality of finite elements for at least a portion of the elastic-plastic material as represented in Equation (4), $$\{f\} = \int_V \{f\}_e dV \quad (4)$$

wherein the calculated total equivalent nodal force vector is obtained by converting stress at bottom dead point of the tool into an equivalent nodal force, the total equivalent nodal force vector consists of a cross-sectional force component (Nx, Ny and Nz) and a bending moment component (Mx, My and Mz) in the global coordinate system;

calculating an amount of only the bending moment component of the total equivalent nodal force vector;

displaying the amount of the bending moment of the total equivalent nodal force vector, which does not include the cross-sectional force component, as an image corresponding to a configuration of the elastic-plastic material;

specifying, among the at least a portion of the elastic-plastic material, a part having the bending moment component of the total equivalent nodal force vector that is larger than the bending moment threshold, as a springback-inducing area, referring to the calculated total equivalent nodal force vector, wherein a subject elastic-plastic material is formed into a modified target configuration that is modified from the first target configuration at the specified springback-inducing area.

* * * * *